United States Patent
Wong et al.

(10) Patent No.: US 12,219,478 B1
(45) Date of Patent: Feb. 4, 2025

(54) LOW-POWER LONG RANGE WIRELESS NETWORK COMMUNICATION PROTOCOL WITH RATE SWITCHING AND SCHEDULED MESSAGING

(71) Applicant: Amazon Technologies, Inc., Seattle, WA (US)

(72) Inventors: Chiu Ngok Eric Wong, San Jose, CA (US); Robert Barton, Seattle, WA (US); Uttam Bhat, Fremont, CA (US); Muhammad Sharifuzzaman Khan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 17/867,590

(22) Filed: Jul. 18, 2022

Related U.S. Application Data

(63) Continuation of application No. 16/884,960, filed on May 27, 2020, now Pat. No. 11,395,225.

(51) Int. Cl.
*H04W 52/02* (2009.01)
*H04L 1/18* (2023.01)
*H04W 72/21* (2023.01)
*H04W 72/23* (2023.01)
*H04W 76/28* (2018.01)

(52) U.S. Cl.
CPC ........... *H04W 52/0216* (2013.01); *H04L 1/18* (2013.01); *H04W 72/21* (2023.01); *H04W 72/23* (2023.01); *H04W 76/28* (2018.02)

(58) Field of Classification Search
None
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |

(Continued)

*Primary Examiner* — Clemence S Han
(74) *Attorney, Agent, or Firm* — Eversheds Sutherland (US) LLP

(57) ABSTRACT

A method for a first network device involves transmitting, to one or more second network devices, an uplink message that includes an indication of a receive window time interval, and may also include an indication of a request for a downlink message. The method also involves initiating a scheduled receive mode that causes the first network device to transition the first network device to a first power state, and perform a receive window procedure after the receive window time interval has elapsed. The receive window procedure includes transitioning the first network device to a second power state and listening for the downlink message for a duration of time. The method further involves determining that an expiration condition has been met while the first network device is in the scheduled receive mode. Additionally, the method involves terminating the scheduled receive mode upon determining that the expiration condition has been met.

24 Claims, 15 Drawing Sheets

(56) References Cited

U.S. PATENT DOCUMENTS

| | | |
|---|---|---|
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2008/0137570 A1* | 6/2008 | Min .............. H04B 1/707 375/295 |
| 2010/0273519 A1* | 10/2010 | Yen .............. H04W 52/0274 455/522 |
| 2013/0086206 A1* | 4/2013 | Sultenfuss ........... H04W 84/12 709/217 |
| 2014/0019792 A1* | 1/2014 | Oh ................ G11C 7/1066 713/501 |
| 2018/0206277 A1* | 7/2018 | Krenz ............ H04W 28/22 |
| 2019/0082390 A1* | 3/2019 | Azizi ............ H04L 5/0007 |
| 2019/0306797 A1* | 10/2019 | Azizi ............ H04L 27/2603 |
| 2020/0137686 A1* | 4/2020 | Cao ............ H04W 52/0235 |

* cited by examiner

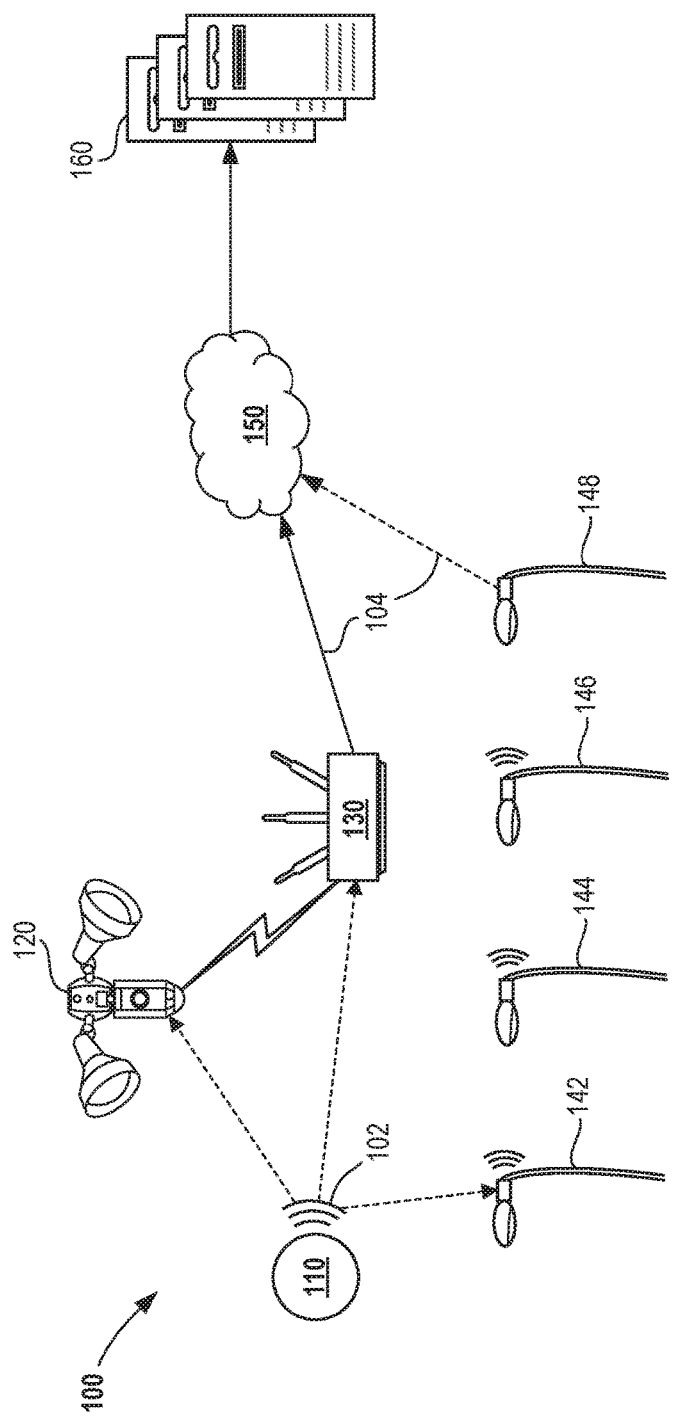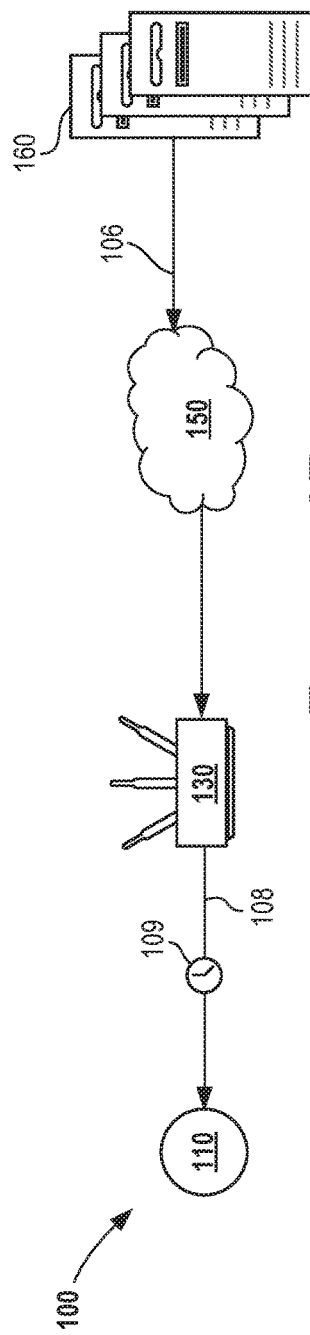

LOW-POWER LONG RANGE WIRELESS NETWORK COMMUNICATION PROTOCOL WITH RATE SWITCHING AND SCHEDULED MESSAGING

CROSS REFERENCE TO RELATED APPLICATIONS

This application is a continuation and claims priority to U.S. patent application Ser. No. 16/884,960, filed on May 27, 2020, titled "LOW-POWER LONG RANGE WIRELESS NETWORK COMMUNICATION PROTOCOL WITH RATE SWITCHING AND SCHEDULED MESSAGING," the entire contents of which are incorporated herein by reference.

BACKGROUND

With the advent of the Internet of Things (IoT) and proliferation of networked devices, there is a growing need for wireless communication networks that communicatively connect such devices to computing devices, services, and other IoT devices. While typical wireless local area networks (WLANs) may be suitable for short-range communication to nearby devices-such as within or in close proximity to a home, office, or other premises-such WLANs have insufficient power and/or range to facilitate communication with devices even a moderate distance from the wireless router. In some cases, devices that are located out of range of a WLAN may access mobile broadband communications, which is capable of extending further distances compared to typical WLANs. However, most mobile broadband communication is restricted to devices associated with paid user accounts, and often involves complex communication schemes that draw substantial power, rendering mobile broadband communication cost-prohibitive or technically infeasible for many applications. Accordingly, there exists a desire for low-power, long-range, and low-cost wireless communication methods.

SUMMARY

Digital wireless communication has traditionally been achieved through WLANs and mobile broadband communications. For example, a user may install a wireless router in that user's home that enables that user to connect his or her networked devices across that WLAN and/or to the Internet by way of a modem or the like. While that WLAN is suitable to provide wireless networking within the home, the strength of the WLAN signal may diminish with increasing distance from the home to the surrounding premises. For instance, the WLAN signal may be inadequate to facilitate communication with a device positioned in the user's yard or along the street or sidewalk.

For mobile devices, such as cellular telephones, smartphones, and other client devices, it has become commonplace to include a wireless radio capable of facilitating communication with mobile broadband towers (e.g., when those devices are registered with a particular mobile broadband provider and linked to a billing account). Such mobile broadband communication may be suitable for devices whose operation is dependent upon stable and continuous data connections, for devices that have sufficient battery capacity to maintain and facilitate mobile broadband communication, and/or where the cost of using such a mobile broadband service is feasible or acceptable.

Other wireless communication methods exist that vary in power consumption and range, with many such methods being classified as "personal area networks" (PANs). In most existing PAN protocols, including those that use the 2.4 GHz frequency band, the range at which devices can communicate is proportionate to the power provided to the wireless radio driving that communication. As a result, such PAN protocols may be capable of extending beyond the range of traditional WLANs, but often at the cost of substantially increasing power consumption.

In recent years, low-power wide area network (LPWAN) protocols have been proposed to reduce power consumption and increase range beyond typical WLAN and PAN capabilities. Many proposed LPWAN protocols achieve reduced power and increased range by leveraging a lower frequency band compared to other wireless communication protocols, which reduces the rate of diminution of signal power over a given distance, and therefore can achieve increased range with the same or less power than would be required for communication on a higher frequency band. Most of the existing LPWAN protocols only enable one-way communication and lack a robust routing protocol. Moreover, many LPWAN protocols are implemented on proprietary hardware, such that its use has been primarily confined to specific applications with specific hardware, such as long-range logistics tracking.

The present disclosure includes the realization that bidirectional, long range, and low-power wireless communication between two networked devices can be achieved through the transmission of messages at predetermined or scheduled time intervals. An example wireless communication system may include a gateway device capable of communicating over two or more wide area networks (WANs), such as the Internet and a low- or reduced-power wide area network, and an endpoint device capable of transmitting packets to and receiving packets from a networked device such as that gateway device. In some cases, the system may also include a server or other computing device that executes one or more applications and that receives data from and/or transmits commands to endpoint devices via the gateway device or another suitable device. The endpoint device may, in some instances, include a processor and memory that executes instructions or application(s) that cause the endpoint device to occasionally transmit an uplink message to the gateway device, which in turn transmits that uplink message to the server. The uplink message may include information encoded therein indicating one or more times or periods of time at which the endpoint point expects to receive a response. The endpoint device may, in some cases, wirelessly communicate using a low-power and low data rate (LDR) communication method (e.g., chirp spread spectrum using a frequency band around 900 MHz, such as in the range of 902-928 MHz, among other possible modulation techniques and frequency bands).

The server may process the uplink message (e.g., the data payload and/or headers of the data packet) and, in some cases, generate a response to the endpoint device. The server may transmit the response as a downlink message to the gateway device (and/or other gateway devices). After receiving the downlink message, the gateway device may wait (or perform other actions) until one of the times or periods of time indicated in the uplink message, and then transmit the downlink message to the endpoint device at or during a time that the endpoint device indicated it would anticipate receiving a response. While waiting for a response, the endpoint device may enter a low-power state or "sleep" mode to reduce power consumption, "waking" or powering the wireless radio at the times or for the periods of time indicated in the uplink message for a duration of time (referred to herein as the "dwell period") to listen for a downlink message. If no message is detected during the dwell period, then the endpoint device may transition back into the low-power state or sleep mode for an interval of time (which may be referred to herein as the "receive window time interval"). However, if a downlink message is detected during the dwell period, then the endpoint device's power state may remain in the "wake" mode past the expiration dwell period to capture the entire downlink message. In this manner, an endpoint device may await receipt of a downlink message while consuming very little power, at least compared to keeping the wireless radio on and powered for the entire duration between transmitting the uplink message and receiving the downlink message. The operations between the transmission of the uplink message and the receipt of the downlink message may be collectively referred to as the "scheduled receive mode" or "scheduled RX mode."

In various embodiments, the endpoint device may adjust aspects of scheduled receive mode while awaiting receipt of a downlink message. For instance, the endpoint device may increase or decrease the receive window time interval, to either reduce the latency between the uplink and downlink messages, or to reduce power consumption, respectively. As another example, the endpoint device may increase or decrease the dwell period, to either accommodate for potential time misalignments between the endpoint device and the gateway, or to reduce the power consumption, respectively. In some cases, the endpoint device may implement a timeout feature that limits the number of times that the endpoint device wakes to listen for a downlink message, or that reduces the overall duration of any given scheduled receive mode. In each of these examples, the endpoint device may assess its battery level, environmental conditions, and/or other factors to determine whether to adjust or terminate a scheduled receive mode to conserve power. Regardless of the particular technique used, the endpoint device may effectively "register" with a gateway the times at which it expects to receive downlink messages, and may in some cases update its registered time slot(s) before receiving a downlink message.

The gateway device may, in addition to serving as an intermediary between the endpoint device and the server, serve as an access point for other devices. For example, the gateway device may receive uplink messages from and/or transmit downlink messages to one or more other endpoint devices. In these examples, the gateway device may periodically (although not always strictly according to a predetermined period) transition to a data receive mode, whereby the gateway device listens for and receives uplink messages from nearby endpoint devices. In addition, the gateway device may act as a scheduler, receiving downlink messages from the server, scheduling the transmission of each downlink message according to the registered time slots or time intervals of the device associated with that downlink message, and transmit the downlink messages to their respective endpoint devices at a suitable time slot. In some cases, the gateway device may locally store such time interval or time offset information in association with a particular endpoint device upon receipt of an uplink message from that particular endpoint device, which the gateway device later uses to determine when to transmit a downlink message to that particular endpoint device. In other cases, the gateway device may pass along such timing information to the server, which may in turn convey a representation of that timing information back to the gateway device or another gateway device.

In various embodiments, the gateway device may be operable to switch between two or more data rate modes, such as a high data rate (HDR) mode (e.g., using a chirp spread spectrum (CSS) method with a spreading factor (SF) of 7, among other possible methods), and a low data rate (LDR) mode (e.g., using a CSS method with an SF of 11, among other possible methods). For example, the gateway device may alternate between an HDR receiving (HDR RX) mode and an LDR receiving (LDR RX) mode, such that it can listen for messages from two different types of devices communicating using two different modes of wireless communication. In addition, the gateway device may transition to an HDR transmit (HDR TX) mode or an LDR transmit (LDR TX) mode, based on receiving data messages from the server and queuing those messages for downlink transmissions to their respective devices (at scheduled times, if applicable). In this manner, a single gateway device may send and receive messages at two different data rates, in addition to communicating with the server across a different wide area network (WAN), such as the Internet.

BRIEF DESCRIPTION OF THE DRAWINGS

The various embodiments of the present low-power and long-range wireless communication techniques now will be discussed in detail with an emphasis on highlighting the advantageous features. These embodiments depict the novel and non-obvious low-power and long-range wireless communication techniques shown in the accompanying drawings, which are for illustrative purposes only. These drawings include the following figures, in which like numerals indicate like parts:

FIGS. 1A and 1B are schematic diagrams illustrating example processes for conveying messages between an endpoint device and a server, according to various aspects of the present disclosure;

DETAILED DESCRIPTION

Figure 2:
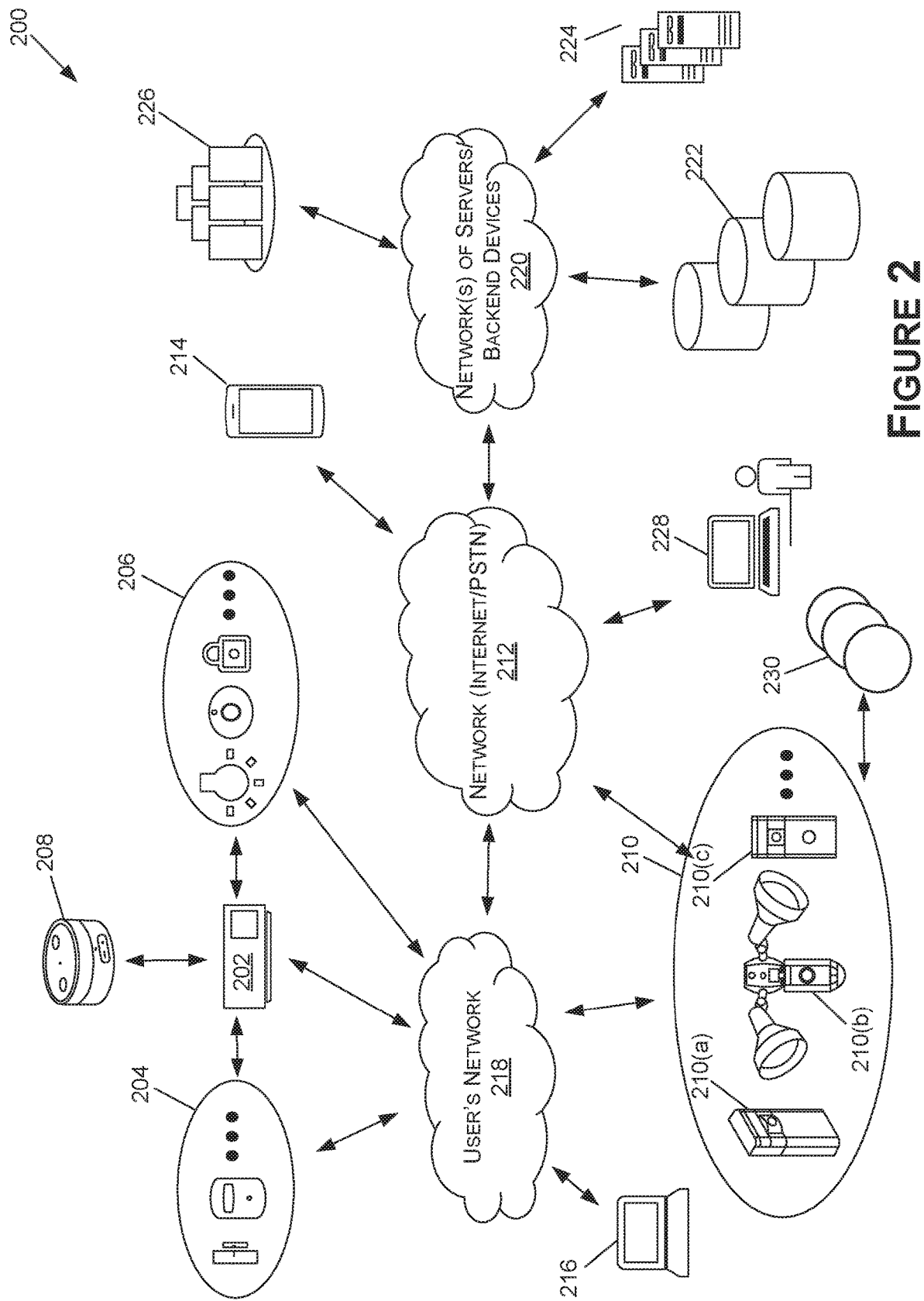
FIG. 2 is a schematic diagram illustrating an example system for communicating in a network, according to various aspects of the present disclosure.

Example embodiments of the present disclosure involve the implementation of a low-power and long-range wireless wide area network (WAN) protocol capable of balancing latency, power consumption, reliability, and integration with higher-power and shorter-range WAN protocols. As the demand for networked devices continues to grow—and as existing products are being replaced by "smart" alternatives in industries such as home automation, networked "smart city" infrastructure, agriculture, logistics, and monitoring devices for biology research and pets—the desire for low-power wide area wireless networking schemes to facilitate reliable long-range communication with low power consumption has increased. In some applications, it is particularly desirable to implement a wireless communication protocol on an endpoint device that consumes very low power, which allows an endpoint device to be in use for long periods of times (e.g., weeks, months, or even years) without replacing or recharging the battery.

Typical WAN protocols, such as various 3G and 4G telecommunication cellular network standards, can achieve data transmission rates sufficient to facilitate near-real time voice communication, and to transmit text, images, and other data over distances up to 50 kilometers under ideal conditions. To enable such high speed and long-distance wireless communication, such networks include large, elevated antennae connected to high-power and low-noise transceivers (e.g., emitting in the range of 40 dBm to 60 dBm per channel) that are able to broadcast high-power downlink signals and to significantly amplify weak uplink signals. In addition, a typical device configured to communicate with a cellular base station may generate and transmit signals at sufficiently high power levels (e.g., up to approximately 2 Watts or 33 dBm) to offset the power attenuation of those signals as they travel from the device to the base station's antenna. Together, the cellular base station and device consume a substantial amount of power to facilitate long-distance communication.

In addition, many wireless WAN (WWAN) and wireless local area network (WLAN) communication protocols include a "handshake" or call-and-response procedure to determine whether messages transmitted from one device were received by another device. In some cases, a series of handshakes may be performed and/or repeated to maintain a "connection" between a base station and a device. While such operations may mitigate against potential packet loss due to interference, encoding errors, and/or decoding errors, they introduce additional steps in a wireless communication scheme that further increases power consumption. With these constraints, most long-distance wireless communication methods are not generally considered "low-power," as their implementation generally requires frequent battery recharging and/or replacement to sustain long-term operation of a device. Even using a modern, high-capacity battery, the power consumed by the cellular data transceiver of a typical mobile device depletes the device's battery in a matter of days, leading to the common practice of recharging such devices on a daily basis. As a result, most WWAN protocols are not suitable for devices where sustained operation on a single battery charge is desired.

In contrast with the above-described WWAN implementations, low-power WAN (LPWAN) techniques, such as the techniques disclosed herein, enable wireless communication at comparable ranges while consuming significantly less power. In general, such advantages may be accomplished by reducing transmission power, using an alternative modulation scheme, and/or reducing the data overhead (e.g., error checking, handshakes, etc.). Often, these power-reduction methods lead to reduced data transmission rates. However, a comparatively lower data rate may be acceptable in some applications (e.g., inventory management, animal location, IoT sensors, etc.), and the increased battery life (e.g., in the range of one or more months to multiple years) may enable the implementation of battery-powered network devices for uses in which frequent battery recharging or replacement is infeasible.

Embodiments of the present disclosure include a low-power WAN (LPWAN) protocol in which an endpoint device is in a low-power or standby mode for substantial periods of time and which, occasionally, for short windows of time, wakes from the low-power mode to briefly listen for downlink messages including data, commands, and/or responses to previously transmitted uplink messages. The short listening time periods of an endpoint device may be "registered" or otherwise known by one or more gateway devices, such that any downlink messages directed to that endpoint device can be transmitted during the listening periods, and not during the low-power intervals between those short listening periods. In this manner, an endpoint device may effectively consume a very small fraction of the power that it otherwise would if it were listening continuously for downlink messages. Aspects of the endpoint device's particular embedded application(s), the particular implementation of a gateway, and/or a server in communication with the gateway may be adjusted to achieve a balance of suitable latency, power consumption, and range.

The gateway device may, at a minimum, include a combination of hardware and/or software to enable the gateway device to receive uplink transmissions from endpoint devices, transmit received uplink messages to a server, receive downlink messages from the server, and transmit downlink messages to endpoint devices. In various embodiments of the present disclosure, the gateway device may implement a scheduling application that facilitates scheduled downlink transmissions to endpoint devices synchronized with the times at which those endpoint devices are listening for downlink messages.

In an example implementation, a gateway device may receive an uplink message from an endpoint device and store information about that endpoint device (e.g., a unique identifier, a transmission time, a time offset between the transmission and receipt of the uplink message, a receive window time interval set by the endpoint device, and/or other information). The gateway device may then transmit at least a portion of that uplink message (e.g., removing extraneous information such as a physical header) to a server, which in turn processes the data payload and transmits a downlink response message back to the gateway device. After receiving the downlink response message, the gateway device may determine, based on the stored information about the endpoint device, a time at which that endpoint device will have awoken from the low-power mode and will be listening for a downlink response message. When that time arrives, the gateway device may perform the downlink transmission to the endpoint device. In various instances, the gateway device may attempt to schedule a queued downlink transmission at the next available time slot that both aligns with the endpoint device's listening window, and which does not conflict with another already scheduled action by the gateway device.

In some embodiments, a gateway device may implement multiple wireless WAN protocols at different frequency bands, modulation schemes, spreading factors, and/or message structures or schemas, among other aspects. In an example embodiment, a gateway device may switch between different data rates to enable communication with devices across two different wireless protocols. For instance, a gateway device may be operable to communicate with devices using a chirp spread spectrum (CSS) modulation scheme at a low data rate (LDR) (e.g., with a spreading factor (SF) of 11) and at a high data rate (HDR) (e.g., with a SF of 7). In some cases, multiple data rates using the same or substantially similar modulation schemes may permit the gateway device to perform both LDR and HDR communication using the same wireless radio. In these embodiments, the gateway device may switch between LDR and HDR transmitting and receiving modes, interweaving downlink messaging with alternating LDR and HDR listening windows.

Traditionally, information has been encoded into electromagnetic waves through the modulation of a signal's amplitude, frequency, phase, or some combination thereof. For example, bits of data can be encoded by shifting a signal's amplitude between two or more distinct power levels at discrete time intervals. As another example, information may be encoded into a carrier wave by changing that wave's frequency (within a particular frequency band or "channel") between successive time intervals. Various modulation schemes have been proposed that alter a signal's amplitude, frequency, and/or phase across time to represent digital information.

A subset of these modulation techniques referred to as "spread-spectrum" techniques leverage most or all of the available bandwidth in a given frequency band by hopping or sweeping across frequencies within a particular frequency band or channel. As an example, chirp spread spectrum (CSS) is a technique in which the frequency of a signal sweeps from a starting frequency to an ending frequency over a time interval, often increasing linearly so as to resemble a "chirp." In this example, the starting frequency and/or stopping frequency within a given time interval may represent a symbol (e.g., one or more bits). For instance, using a 500 kHz band from 900 MHz to 900.5 MHz, a chirp may sweep from 900 MHz to 900.5 MHz across a particular time interval, which may be representative of the number 0. In addition, a chirp that sweeps from 900.25 MHz to 900.5 MHz, then quickly drops to 900 MHz and increases linearly back to 900.25 MHz (all within a chirp time interval) may represent the number 63 (or its equivalent in bits, bytes, hexadecimal numbers, or any other suitable numbering system). It will be appreciated that other frequency ranges (e.g., 100 MHz to 1.7 GHz, such as 400 MHz to 1000 MHz, such as 915 MHz to 928 MHz, among other possible frequency ranges) and associations between starting frequencies and symbols may be used, depending upon the particular implementation. In other words, a chirp signal may, within a given time interval, linearly rise (or fall) from a starting frequency to the edge of the band, quickly change to a frequency at the opposite edge of the band, and linearly rise (or fall) approximately back to the starting frequency. In this manner, the starting and/or stopping frequency may encode digital information, which can be decoded by a device that is synchronized to the phase of the chirp time intervals (synchronization which may be accomplished by transmitting a sequence of known chirps before transmitting encoded information, e.g., as a preamble).

CSS modulation may be performed using a particular set of parameters (e.g., bandwidth, spreading factor, code rate, etc.), each of which may affect the effective or actual data transmission rate. The bandwidth of a channel may serve to limit the range of frequencies between a lower bound and an upper bound, with the difference between the upper bound frequency and the lower bound frequency defining the bandwidth of the channel itself. For example, a frequency band between 500 MHz and 500.25 MHz would have a bandwidth of 250 kHz. If all other parameters are held constant, then an increase in bandwidth generally results in a higher data transmission rate (e.g., in bits per second).

In addition, the "spreading factor" (SF) parameter of CSS modulation may affect the data transmission rate. In some implementations, the SF may define the number of bits of information that can be represented by a symbol or chirp. As described herein, the term "symbol" generally refers to information that can be encoded and modulated into a chirp and/or decoded and demodulated from a chirp. A symbol may, in some implementations, represent binary information in the form of bits, which may be interpreted as one or more bytes, base-10 integers, hexadecimal values, and/or other representation of information. In an example CSS modulation configuration, an SF of 7 may provide for 128 different symbols (e.g., a decimal value from 0 to 127, sixteen bytes, 128 separate binary flags, some combination thereof, etc.). As another example, an SF of 12 may provide for 4,096 different symbols (e.g., a decimal value from 0 to 4,095, 512 bytes, 4,096 separate binary flags, some combination thereof, etc.). However, although the lower SF leads to less data per symbol, the lower SF also leads to a shorter symbol time interval (also referred to herein as "symbol duration"). As a result, a lower SF (e.g., 7) may result in a higher effective data transmission rate compared to that of a higher SF (e.g., 12). In some implementations, the data transmission rate may be calculated based on the product of the SF and the bandwidth, divided by $2^{SF}$.

While a lower SF can provide for a higher effective data transmission rate compared to that of a higher SF, it may be advantageous to use a higher SF over a lower SF, depending upon the particular circumstances. For instance, in situations where a signal is weak (e.g., when an endpoint device is positioned far from a gateway) or where interference is substantial (e.g., when other devices are simultaneously transmitting signals having frequencies overlapping with the frequency band, when the signal-to-noise ratio (SNR) is near or below 0 dB, etc.), a higher SF signal may be more likely to be successfully received and decoded compared to a lower SF signal. Accordingly, a lower data rate may be preferred over a higher data rate if there is a substantial likelihood that the lower SF signal would be too weak or lost to interference.

Some endpoint devices and gateway devices of the present disclosure may be configured to operate an LPWAN radio using CSS modulation at one or more SF values (e.g., 7, 12, and/or other possible SF values), such that the devices may be said to operate in at least a low data rate (LDR)

transmission or receive mode, and/or a high data rate (HDR) transmission or receive mode, among other possible data rate transmission or receive modes. For example, an endpoint device may be situated in relatively close proximity to the gateway device (e.g., a gateway device within 30 meters of an LPWAN-equipped lamp), such that the advantages of LDR communication (such as robustness to noise, signal attenuation, etc.) are outweighed by the advantages of HDR communication (such as a greater effective data transmission rate). In this example, the endpoint device may be configured to operate in an HDR transmission mode and/or an HDR receive mode, while the gateway device may be configured to likewise operate in an HDR transmission mode and/or an HDR receive mode at least some of the time. As another example, an endpoint device that is known to be or is likely to be positioned a substantial distance from a gateway device (e.g., a temperature sensor in a remote location far from the nearest gateway device) may be configured to operate using an LDR transmission mode and/or an LDR receive mode, to improve the reliability of its communication with a gateway device over that substantial distance. In yet another example, a non-stationary endpoint device (e.g., an LPWAN-enabled pet collar) may sometimes be close to a gateway device (e.g., when the pet is at home), and other times far from a gateway device (e.g., if the pet strays or otherwise becomes lost). In such examples, the endpoint device may be configured to switch between HDR and LDR communication modes, depending on the endpoint device's proximity to a gateway device, the detected motion or acceleration of that device, the duration since the most recent successful downlink communication, and/or instructions from a server or client device, among other possible bases for switching between HDR and LDR communication modes.

In some cases, the "coding rate" (CR) parameter may also impact the effective data transmission rate. As described herein, an "effective" data transmission rate may refer to the number of bits or symbols of data transmitted per unit time, which may be lower than the actual data transmission rate (which may include error bits or other non-message information). The CR parameter relates to the encoding of redundant bits of data for the purpose of error detection and/or correction, such as forward error correct (FEC). In various implementations, one or more bits of added data may be encoded to mitigate potential data loss due to signal interference, noise, or insufficient signal strength. Because the CR parameter may result in added bits of redundant data to a message, higher CR values may result in lower effective data transmission rates. However, it will be appreciated that in scenarios where decoding errors are likely (e.g., due to noise, interference, weak signals, etc.), the inclusion of error correction bits may result in a net increase in the rate of data that is able to be accurately demodulated and decoded.

In an example implementation, the CR parameter may represent the number of error correcting bits added for each predetermined number of data bits. For example, a CR of 1 may add one error-correction bit for each four bits of data, such that one-fifth of the bits transmitted are error correcting bits. As another example, a CR of 4 may add four error-correction bits for each four bits of data, such that one-half of the bits transmitted are error correcting bits. Other CR values are also possible (e.g., 0 to 12, such as 1 to 8, such as 1 to 4, among other possible CR values), and may vary among different implementations. In some cases, the CR may differ for different portions of a message (see, e.g., FIG. 10 for an example message structure). As a specific example, the CR of a preamble may be 0, the CR of the header(s) of the message may be 4, and the CR of the data payload may be configurable (e.g., set by the transmitting device and/or indicated in a header of the message before the payload is transmitted, with values such as 1 to 8, such as 1 to 4, among other possible CR values).

In some implementations, error correction may be omitted from particular messages and/or particular portions of those messages. In general, for wireless communication techniques in which no message acknowledgment occurs (e.g., no handshake confirming receipt of a message), the use of error correction bits may be advantageous for at least the reason that the error correction bits enable the receiving device to both identify and correct for errors in the transmission. As a result, errors resulting from signal interference that might otherwise result in a transmission failure can be corrected for, without the need for any additional message transmissions. In some embodiments, error correction bits for the payload may be included in uplink messages (e.g., from an endpoint device to a gateway device), and may be omitted in downlink messages (e.g., from a gateway device to an endpoint device). In this manner, the potential need for redundant message transmissions is reduced for uplink messages-which may be beneficial to avoid excessive battery consumption. In addition, without downlink message error correction bits on the payload, the endpoint device may consume less battery power than might otherwise be consumed if the downlink message payloads had to be processed for errors. Other implementations are also possible (e.g., a higher CR value for the payload of uplink messages and a comparatively lower non-zero CR value for the payload of downlink messages, the same CR values for the payload of both uplink and downlink messages, or a higher CR value for the payload of downlink messages and a comparatively lower CR value for the payload of uplink messages, etc.).

In some embodiments, the WAN protocol may enable endpoint devices to specify and update information related to the timing of the device's receive windows. For example, the WAN protocol may include a portion of an uplink message that indicates an endpoint device's receive window time interval (e.g., the duration of time between listening periods). In these embodiments, the endpoint device may transmit uplink messages to inform the gateway device of its receive window time interval. The ability to update an endpoint device's relative wake and sleep duty cycle may enable the endpoint device to adjust its power consumption (e.g., based on a battery level of the endpoint device). Conversely, the endpoint device may reduce its receive window time interval to reduce the latency of messaging to and from the endpoint device (e.g., where more frequent messaging is desirable over power conservation).

In practice, a WAN network based on the protocol described herein may include multiple gateways with overlapping coverage, and potentially multiple endpoint devices present within those overlapping regions. In this scenario, a particular endpoint device might transmit an uplink message that is detected by two or more gateway devices. In various embodiments, the gateway devices may each convey at least a portion of an uplink message to a server, which may process the information and determine which gateway device or devices to transmit a responsive downlink message (e.g., based on which gateway device is in closer proximity to the endpoint device, which gateway device is available to perform the downlink transmission soonest, and/or other factors). In some cases, the server may transmit a downlink message to multiple gateway devices, each of which may attempt to simultaneously (or at different times) transmit the downlink message to a respective endpoint device. The particular manner in which messages are routed and whether the messages are sent to and/or received by multiple gateway devices may vary among different implementations and/or for different applications.

By way of example, an animal locating application (e.g., for a user's pet, for biological research, etc.) may account for an anticipated movement speed of the animal, the latency of communication via the low-power WAN protocol, and/or other factors to determine to which gateway device or devices a downlink message should be routed. For instance, for a research project following an animal for a one-month period with a low-power WAN endpoint device, the endpoint device's application may be configured to provide at least one month of battery life, which includes an initial receive window time interval for scheduled downlink messages of ten seconds. If the potential speed of the animal is 30 miles per hour (or 0.5 miles per minute), and the range of each gateway device is half of a mile, then the possible approximate locations of the animal may be determined based on an initial approximation of the animal's location and the amount of time that has elapsed since the most recent uplink transmission. Depending on the scenario, it may be determined that the animal might have moved out of range of one gateway device, and potentially within range of one or more nearby gateway devices. In this case, the server may direct downlink messages to those one or more nearby gateway devices and/or the initial gateway device, to attempt to communicate with the endpoint device, which may have moved out of range of that initial gateway device.

Although the above example describes a particular use case of the present application's low-power WAN protocol, it will be appreciated that other applications for entirely different purposes may similarly leverage aspects of the protocol to provide a low-power, long-range, and cost-effective means of wireless communication, potentially expanding beyond the range of one single gateway device.

As described herein, "high data rate" or "HDR" may refer to a mode of communication that is comparatively faster in terms of number of bits transmitted or received per second than another form of communication. For instance, in an embodiment comprising a chirp spread spectrum (CSS) modulation scheme, an HDR may correspond to a spreading factor (SF) of 7. Similarly, "low data rate" or "LDR" may refer to a mode of communication in which the number of bits transmitted or received per second is comparatively slower than another form of communication. For instance, in an embodiment comprising a CSS modulation scheme, an LDR may correspond to an SF of 11. In some cases, an HDR may be used to send and receive the same data message in a shorter amount of time compared to an LDR.

As described herein, "uplink" generally refers to a direction of data flow from an endpoint device toward a backend server or application server (hereinafter "server"). For example, a gateway device may receive uplink messages (e.g., data, frames, messages, packets, and/or requests, among other possible forms of information) from an endpoint device, and may in turn transmit at least a portion of the received uplink messages to a server. In some cases, an uplink message may contain a request for a response from a server or the like, which may be indicated through one or more modulated bits in a frame, header, or other portion of a message.

As described herein, "downlink" generally refers to a direction of data flow from a server toward an endpoint device. For example, a gateway device may receive downlink messages (e.g., data, frames, messages, packets, and/or commands, among other possible forms of information) from a server, and may in turn transmit at least a portion of the received downlink messages to the endpoint device.

As described herein, a "message" may generally refer to information encoded as a sequence of bits that includes a "payload," such as data, requests, commands, and/or instructions, as well as one or more "headers," such as metadata indicating the context of the message (e.g., indicative of the type of message, a source identifier or address, a destination identifier or address, information about the state of a device, an indication of whether the message is one among a sequence of messages, etc.). Portions of a message may be added or removed as a message travels from one device to another. For example, a message from an endpoint device to a gateway device may include a preamble and/or physical header that a gateway device uses to detect the uplink message transmission, which may be removed, partially removed, or otherwise used to modify other portions of the message (e.g., as such information may not be necessary to convey the payload to the destination device after it has been received at the gateway device). As another example, a downlink message received from an endpoint device may lack a physical header, and the gateway device may prepend a physical header to enable the endpoint device to detect the downlink message transmission during a listening period. Messages may be organized or transmitted in a variety of ways, depending on the particular implementation, and may include one or more packets, one or more datagrams, one or more frames, one or more cells, and/or other forms of digitally-encoded information.

As described herein, a "scheduled receive mode" may refer to one or more operations performed by an endpoint device, including transitions to and from a low-power state and listening for downlink messages in between low-power state intervals. In some instances, a scheduled receive mode may perform the transition to a lower power state, transition to a higher power state for a listening period, and if no downlink message is detected, transition back to the lower power state one or more times or "repeatedly." The duration of the listening period when no downlink message is detected may be referred to as a "dwell period," which may be predetermined or otherwise defined as a sufficient duration of time for an endpoint device to detect a downlink message transmission (or a portion of a downlink message transmission, such as an initial set of bits, which may be shorter than the duration of time to receive an entire downlink message).

As described herein, a "transition" from a first power state to a second power state generally refers to a device enabling and/or disabling one or more hardware and/or software elements, or otherwise changing the state of one or more hardware and/or software elements, so as to cause a device to change its average power consumption over a period of time. For example, a wireless radio may include one or more hardware components (e.g., amplifiers, modulators, demodulators, multiplexers, etc.), which may be powered up, powered down, or otherwise operated at two or more power levels. Transitioning from a higher power state to a lower power state may involve reducing the voltage and/or current to one or more of these hardware devices, or changing the speed of their operation (e.g., reducing clock speeds, periodically turning the components on and off, etc.). As another example, a processor may include one or more cores, which may be selectively powered on or off to thereby change the overall state of the device's power consumption. As yet another example, a software application may include a subroutine that executes periodically to perform one or more operations, and that subroutine may be enabled, disabled, or performed at a different period in order to change the effective power consumption of the device over a given period of time. In general, a "higher power state" may describe the state of a device that has enabled or powered a particular combination of hardware and/or software to perform a particular task, as compared to a "lower power state" which may refer to the state of a device that has disabled or reduced power to that combination of hardware and/or software such that the particular task is no longer being performed.

The duration of time between each repetition of the scheduled receive mode operations may be defined by a "receive window time interval." In some implementations, a receive window time interval may define the duration of time during which an endpoint device is in a low-power state within a given repetition. In other implementations, the receive window time interval may define the duration of time in between each repetition (e.g., the period of the scheduled receive mode loop), such that the receive window time interval encompasses both the duration of the low-power state and the dwell period.

As described herein, the term "expiration condition" generally refers to an occurrence of an event or satisfaction of a criteria that causes the endpoint device to terminate the scheduled receive mode. For example, if a downlink message is detected by an endpoint device during a listening period of a scheduled receive mode, the endpoint device may determine that an expiration condition has been met and maintain the endpoint device in the higher power state to continue receiving the remainder of the downlink message transmission. As another example, an endpoint device's application may be configured to repeat the scheduled receive mode for a threshold number of iterations or for a threshold period of time, such that an expiration condition is met if the number of iterations or cumulative duration of time of the scheduled receive mode meets or exceeds that threshold. In yet another example, an endpoint device's application may be configured to modify aspects of the scheduled receive mode, such as the receive window time interval and/or the dwell period, responsive to a particular event or condition (e.g., when the battery level falls below a threshold). In this example, the endpoint device may determine that an expiration condition has been met, terminate the current scheduled receive mode, and initiate a new scheduled receive mode based on a different set of parameters. Other example expiration conditions are described in further detail below.

As described herein, the term "periodic listening mode" may refer to one or more operations performed by an endpoint device, including transitions to and from a low-power state and listening for downlink messages in between low-power state intervals, among other possible operations. Similar to the scheduled receive mode, the periodic listening mode may involve transitioning to a lower power state, transitioning to a higher power state for a short period of time (e.g., a dwell period), and, if no downlink message or command is detected, transitioning back to the lower power state one or more times (e.g., repeatedly). However, whereas the scheduled receive mode may be initiated based on an expected downlink message being received (e.g., in response to an uplink message request), a device may enter a periodic listening mode during periods of time when the device is not awaiting receipt of any particular downlink message. For instance, an uplink message from a device may include a request for data or other information from a server. After sending such an uplink message, the device may enter a scheduled receive mode, transitioning to and from a lower power state at specified time intervals to detect an expected downlink message response. Once the device has detected and received the downlink message response, the device may then transition to a periodic listening mode, as the device is no longer awaiting a particular downlink response message. While the device may not be awaiting a downlink message response to an uplink message request, the server and/or an application executed thereon may nevertheless transmit downlink messages that include commands, instructions, updates, data, and/or other information that was not explicitly requested by the device. To enable the device to receive such non-requested downlink messages, the device may periodically transition out of a lower power state to a higher power state to listen for such non-requested downlink messages. In some cases, the period between successive higher power listening periods may have a longer duration compared to the period between higher power listening periods of a periodic listening mode. In this manner, the device may be able to receive downlink messages (e.g., software updates, pings, commands, configuration parameters, data, etc.) not specifically requested by the device, while providing for reduced battery consumption relative to the battery consumption during the scheduled receive mode. It will be appreciated that the period between higher power modes of the scheduled receive mode (e.g., the receive window time interval) and the period between higher power modes of the periodic listening mode may vary, depending upon the particular application, the available battery power of an endpoint device, a desired latency, a desired battery power longevity, and/or a variety of other factors.

The remaining detailed description describes the present embodiments with reference to the drawings. In the drawings, reference numbers label elements of the present embodiments. These reference numbers are reproduced below in connection with the discussion of the corresponding drawing features.

FIGS. 1A and 1B are schematic diagrams illustrating example processes for conveying messages between an endpoint device 110 and a server 160 via one or more gateway devices 120, 130, 142, 144, 146, 148, according to various aspects of the present disclosure. As shown in FIG. 1A, a system 100 includes the endpoint device 110 that is potentially in range of multiple WAN gateway devices, such as the gateway devices 120, 130, and/or 142. In this example, the gateway device 120 may be similar to or the same as an audio/video (A/V) device, such as A/V devices 210(*a*) and 210(*b*) shown and described in more detail with respect to FIGS. 2 and 3. Although not directly connected to the Internet 150, one or more of the gateway devices 120, 142, 144, 146, 148 may be communicatively coupled (e.g., via Wi-Fi) to the gateway device 130, which itself is connected (either directly or indirectly) to the Internet 150. The gateway device 130 may be, for example, a wireless router or hub device, which may also be operable to communicate directly with the endpoint device 110.

Although not illustrated in FIG. 1A, one or more of the gateway devices 120, 142, 144, 146, 148 may be communicatively coupled to the gateway device 130 via an intermediary or bridge device (not shown). The bridge device may include a first wireless radio for communicating using wireless signals of a first type or protocol and a second wireless radio for communicating using wireless signals of a second type or protocol. For example, the gateway devices 120, 142, 144, 146, 148 may communicate with the bridge device via the first wireless radio using wireless signals in a sub-gigahertz band (e.g., around 900 MHz, such as in the range of 902-928 MHz), while the bridge device may communicate with the gateway device 130 via the second wireless radio using Wi-Fi signals. In other embodiments, any of the gateway devices 120, 130, 142, 144, 146, 148 may itself/themselves comprise a bridge device having a first wireless radio for communicating using wireless signals of a first type or protocol (e.g., 900 MHz) and a second wireless radio for communicating using wireless signals of a second type or protocol (e.g., Wi-Fi).

In the example shown in FIG. 1A, the endpoint device 110 broadcasts an uplink message 102 at a particular time. If the gateway device 120 detects and receives the uplink message 102, it may in turn route that received uplink message to the gateway device 130. Additionally, and/or alternatively, the gateway device 130 may detect and receive the uplink message 102. Regardless of whether the gateway device 120 and/or the gateway device 130 detected the uplink message 102, the gateway device 130 transmits at least a portion 104 of that uplink message 102 via the Internet 150 to the server 160 for processing.

In some cases, gateway devices may also be installed in public spaces, such as on or within a street lamp or a private path lighting device (referred to herein as a "public space" gateway device, although some such devices may be located on private property). Some public space gateway devices may be in communication with each other, but not themselves connected to the Internet 150, while other public space gateway devices may be directly or indirectly connected to the Internet. In the example shown in FIG. 1, the gateway device 142 is in communication range of the endpoint device 110, and detects and receives the uplink message 102. The gateway device 142 may convey that received uplink message 102 to a nearby gateway device 144, which in turn conveys the uplink message 102 to gateway device 146. In some instances, the gateway device 146 may be in wireless communication with the gateway device 130 (e.g., if the gateway devices 142, 144, and 146 are networked lighting devices positioned along a path of a premises). In other instances, the gateway device 146 may convey the received uplink message 102 to another nearby gateway device 148, which may be directly connected to the internet, to enable the gateway device 148 to transmit the uplink message 104 via the Internet 150 to the server 160.

Although FIG. 1A illustrates multiple potential paths through which an uplink message may be detected, routed, and/or otherwise conveyed, it should be understood that various systems may include more or fewer gateway devices configured in ways other than the configuration shown in FIG. 1A. Furthermore, depending on the particular scenario, one or more gateway devices may receive an uplink message and transmit one or more payloads to the server 160. The system 100 shown in FIG. 1A is provided for explanatory purposes to describe a few potential LPWAN network configurations, and does not limit the scope of potential systems, data flow paths, and/or the arrangement of gateway devices of the present disclosure.

After receiving the uplink message 104, the server 160 may process the information contained therein and, in some cases, generate a downlink message 106. The downlink message 106 may be in direct response to the uplink message 104, such as where the endpoint device 102 transmits a request for a response. Additionally, and/or alternatively, the downlink message 106 may be a separate command, instruction, or other data transmitted by the server 160 that is unrelated to the uplink message 104 (e.g., a software or firmware update, a request for the endpoint device's 102 status, etc.). As shown in FIG. 1B, the server 160 transmits the downlink message 106 via the Internet 150 to the gateway device 130. After receiving the downlink message 106, the gateway device 130 may modify, append to, or prepend to (e.g., a physical header) that downlink message 106 to generate the downlink message 108. In some embodiments, the gateway device 130 may determine a time 109 at which to transmit the downlink message 108 to the endpoint device 110, and may subsequently add the downlink message 108 to a downlink transmission queue (not shown). At the scheduled time 109, the gateway device 130 may transmit the downlink message 108 to the endpoint device 110.

As described herein, the endpoint device 110 may transmit timing information, such as a receive window time interval, in the uplink message 102. After completing the transmission, the endpoint device 110 may enter a scheduled receive mode, during which the endpoint device is in a low-power mode interrupted by listening windows that occur periodically based on the receive window time interval. The gateway device 130 may store timing information based on the uplink message 102—such as the receive window time interval, time offsets to account for differences in the local clocks (e.g., real time clock (RTC)) of the endpoint device 110 and the gateway device 130, and unique identifier information associated with the endpoint device 110 (e.g., a MAC address or other unique device identifier)—which the gateway device 130 subsequently uses to align the transmission of the downlink message 108 at a time 109 with the dwell period of the endpoint device 110.

Although FIG. 1B depicts only a single data flow path through a portion of the system 100, it should be understood that the downlink message 106 may be routed to any of the other gateway devices 120, 142, 144, 146, and/or 148, for subsequent downlink transmission to the endpoint device 110. The single data flow path is shown in FIG. 1B for simplicity, and does not limit the scope of possible downlink data flow paths in any way.

FIG. 2 is a functional block diagram illustrating a system 200 for communicating in a network according to various aspects of the present disclosure. Home automation, or smart home, is building automation for the home. Home automation enables users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, gateway devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 and endpoint devices 230 (e.g., a mobile application or endpoint device application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the gateway devices 210, client devices 214, 216, and/or endpoint devices 230 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low-power wide-area network (LPWAN), such as a chirp spread spectrum (CSS) modulation technology network (e.g., LoRaWAN), an Ultra Narrow Band modulation technology network (e.g., Sigfox, Telensa, NB-IoT, etc.), the long-range LPWAN communication protocols according to the present application, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more gateway devices 210. The gateway devices 210 may be networked devices capable of communicating with one or more other networked devices according to one or more protocols, channels, modes, modulation schemes, and/or standards. In some examples, the gateway devices 210 may have a wired or wireless connection to a wide area network, such as the Internet 212. In addition, the gateway devices 210 may include a combination of software and/or hardware to transmit messages to and receive messages from one or more devices within a local area network (LAN), a personal area network (PAN), and/or another wide area network (WAN). Some of the gateway devices 210 may serve primarily as an intermediate connection point to enable devices within the LAN, PAN, and/or WAN, to transmit messages to and/or receive messages from computing devices across the Internet 212, such as devices connected to the network(s) of servers and/or backend devices 220.

In some cases, the gateway device 210 may additionally and/or alternatively be an audio/video recording and communication device (alternatively referred to herein as "A/V devices") (which may represent, and/or be similar to, the device 120 of FIG. 1A). The A/V devices may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices may be configured to access a user's network 218 to connect to a network (Internet/PSTN) 212 and/or may be configured to access a cellular network to connect to the network (Internet/PSTN) 212. The components and functionality of the A/V devices are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more gateway devices 210. For example, the smart-home hub device 202 may be a component of a security system and/or a home automation system installed at a location (e.g., a property, a premise, a home, a business, etc.). In some embodiments, the gateway devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the gateway devices 210, the VA device 208, the sensors 204, and/or the automation devices 206 may, in addition to or in lieu of communicating with the smart-home hub device 202, communicate with the client devices 214, 216 and endpoint devices 230, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or gateway devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices, for outputting the voice of a digital assistant, etc.), at least one microphone (e.g., for receiving commands, for recording audio data, etc.), and a display (e.g., for displaying a user interface, for displaying the image data generated by the A/V devices, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window)

is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, endpoint devices 230, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 and endpoint devices 230. The client devices 214, 216 and endpoint devices 230 may communicate with and/or be associated with (e.g., capable of access to and control of) the gateway devices 210, a smart-home hub device 202, the VA device 208, sensors 204, and/or automation devices 206. In various embodiments, the client devices 214, 216 and endpoint devices 230 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 and endpoint devices 230 includes a connected device, such as a smart watch, Bluetooth headphones, another wearable device, or the like. In such embodiments, the client devices 214, 216 and endpoint devices 230 may include a combination of the smartphone or other device and a connected device (e.g., a wearable device), such that alerts, data, and/or information received by the smartphone or other device are provided to the connected device, and one or more controls of the smart-phone or other device may be input using the connected device (e.g., by touch, voice, etc.).

The gateway devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more servers 224, and one or more application programming interfaces (APIs) 226. While FIG. 2 illustrates the storage device 222, the server 224, and the API 226 as components separate from the network 220, it is to be understood that the storage device 222, the server 224, and/or the API 226 may be considered to be components of the network 220. For example, the network 220 may include a data center with a plurality of computing resources used to implement the storage device 222, the server 224, and the API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216 and endpoint devices 230). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the gateway devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the gateway devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.).

For example, the security monitoring service 228 may operate and control its own client devices and/or network of servers/backend devices for monitoring and/or controlling security systems. In such an example, the gateway devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of servers/backend devices 220).

With yet further reference to FIG. 2, the system 200 may further include endpoint devices 230, may be in communication with one or more gateway devices 210. The endpoint devices 230 may implement one or more wireless WAN communication protocols by which the endpoint devices 230 can communicate with the gateway devices 210, such as the low-power, long-range WAN protocol examples described herein. Example attributes and operations of the endpoint devices 230 are shown and described in greater detail herein.

Figure 3:
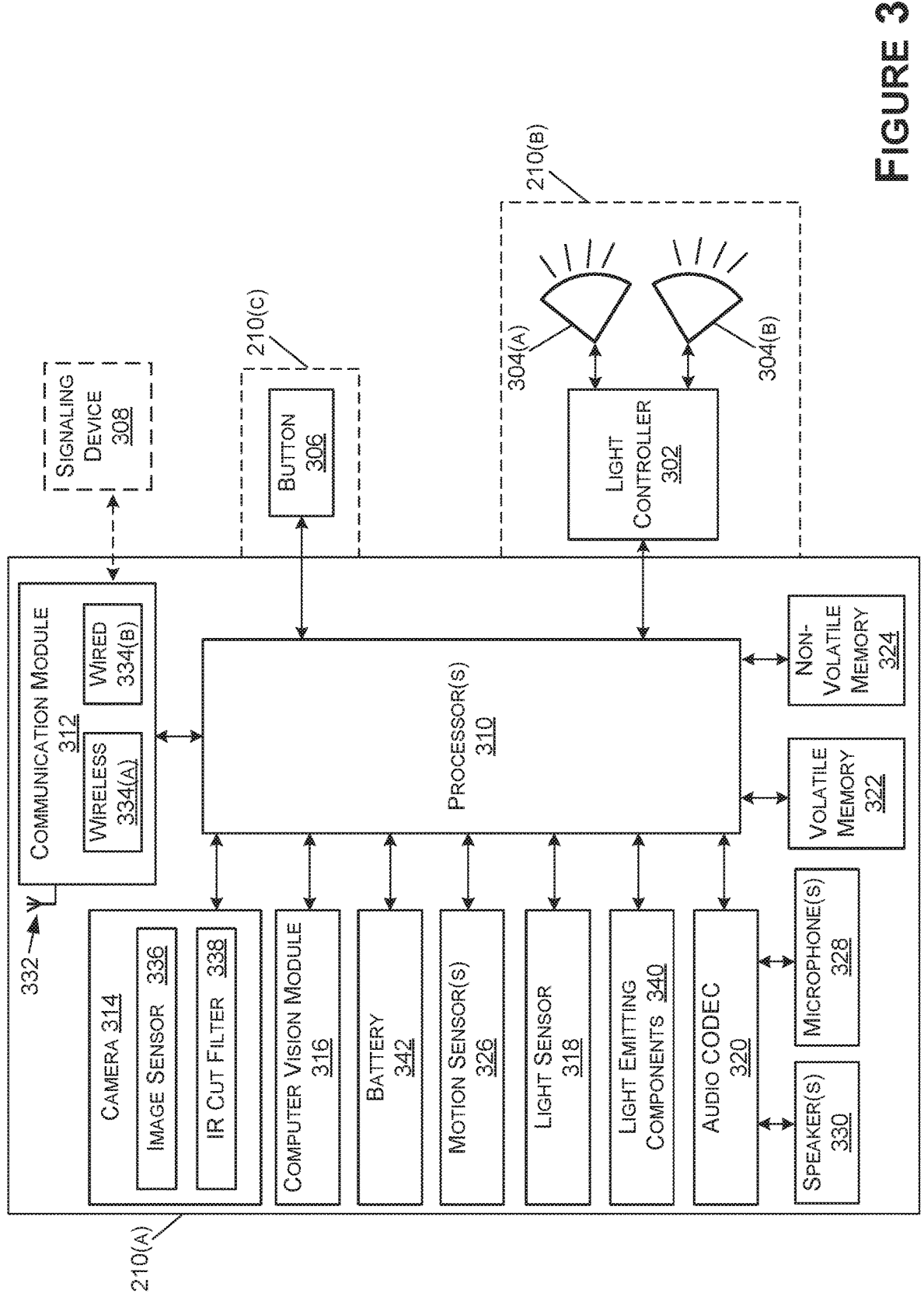
FIG. 3 is a functional block diagram illustrating one example embodiment of an A/V recording and communication device, according to various aspects of the present disclosure.

FIG. 3 is a functional block diagram for an audio/video (A/V) device 210(a) according to various aspects of the present disclosure. The A/V device 210(a) may be a security camera or other type of A/V device, which may also implement the functionality of a gateway device as described herein (e.g., gateway device 210 shown and described with respect to FIGS. 2 and 4, and/or other gateway devices described herein). In some embodiments, the one or more gateway devices 210 may include the light camera 210(b), which may include some or all of the components of the security camera 210(a) in addition to a light controller 302 and one or more lights 304(a), 304(b). In some embodiments, the one or more gateway devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210(a) may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210(a) and other, external devices, external receivers, external transmitters, and/or external transceivers, including the client devices 214, 216 and endpoint devices 230, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s) (e.g., the long-range LPWAN protocols of the present application), and/or satellite networks. The communication module 312 may receive inputs, such as power and/or data, from the camera 314, the processor(s) 310, the button 306 (in embodiments where the A/V device 210(a) is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310. Furthermore, the communication module 312 may incorporate hardware and/or software to facilitate communication according to one or more LPWAN protocols, such as the long-range LPWAN protocols described herein. In some embodiments, the communication module may be configurable to switch between two or more data rate modes, such as LDR and HDR transmitting and/or receiving modes. The communication module 312 may further incorporate memory, or otherwise access memory 322, 324, to implement one or more data messaging queues that may be loaded with messages scheduled for downlink transmission to respective endpoint devices.

With further reference to FIG. 3, the A/V device 210(a) may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210(a).

With further reference to FIG. 3, the A/V device 210(a) may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210(a) out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210(a) may comprise the light sensor 318 and the one or more light-emitting components 340, such as LED's. The light sensor 318 may be one or more sensors capable of detecting the level of ambient light of the surrounding environment in which the A/V device 210(a) may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210(a) may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210(a) may include two or more microphone(s) 328 that are spaced from one another (e.g., located on different sides of the A/V device 210(a)) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data recorded by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210(a) speaks, sound from the visitor (or intruder) is received by the microphone(s) 328 and compressed by the audio CODEC 320. Digital audio data is then sent through the communication module 312 to the network 212 via the user's network 218, routed by the server 224 and/or the API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210(a) may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210(a) may include an integrated circuit (not shown) capable of arbitrating between multiple voltage rails, thereby selecting the source of power for the A/V device 210(a). The A/V device 210(a) may have separate power rails dedicated to the battery 342 and the AC power source. In one aspect of the present disclosure, the A/V device 210(a) may continuously draw power from the battery 342 to power the A/V device 210(a), while at the same time routing the AC power to the battery, thereby allowing the battery 342 to maintain a substantially constant level of charge. Alternatively, the A/V device 210(a) may continuously draw power from the AC power to power the doorbell, while only drawing from the battery 342 when the AC power is low or insufficient. Still, in some embodiments, the battery 342 comprises the sole source of power for the A/V device 210(a). In such embodiments, the components of the A/V device 210(a) (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210(a) may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210(a) so as to reduce interference from heat, pressure, moisture, and/or other stimuli generated by the internal components of the A/V device 210(a).

With further reference to FIG. 3, the A/V device 210(a) may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be recorded by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210(a).

In some embodiments, computer vision module(s) (CVM) 316 may be included in the A/V device 210(a) as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210(a) when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210(a), etc. In various embodiments, the motion sensor(s) 326 include a plurality of different sensor types capable of detecting motion such as PIR, AIR, low-power CVM, and/or cameras.

As indicated above, the A/V device 210(a) may include the CVM 316 (which may be the same as the above described low-power CVM 316 implemented as one or more motion sensor(s) 326, or may be additional to, or alternatively separate from, the above described low-power CVM 316). For example, the A/V device 210(a), the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210(a), the computer vision module 316 may additionally, or alternatively, be included as a component of the hub device 202, the VA device 208, and/or one or more components of the network of servers/backend devices 220. With respect to the A/V device 210(a), the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

Again, with reference to FIG. 3, in embodiments where the A/V device 210(a) includes a light camera, the A/V device 210(a) may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210(a) includes a doorbell, such as the video doorbell 210(c), the A/V device 210(a) may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210(a) (in some embodiments, via at least one of the hub device 202, the VA device 208, and/or one or more components of the network of servers/backend devices 220).

Although the A/V recording and communication devices (such as A/V device 210(a)) is referred to herein as an "audio/video" device, the A/V device 210(a) need not have both audio and video functionality. For example, in some embodiments, the A/V device 210(a) may not include the speakers 330, microphones 328, and/or audio CODEC. In such examples, the A/V device 210(a) may only have video recording and communication functionalities. In other examples, the A/V device 210(a) may only have the speaker(s) 330 and not the microphone(s) 328, or may only have the microphone(s) 328 and not the speaker(s) 330.

Figure 4:
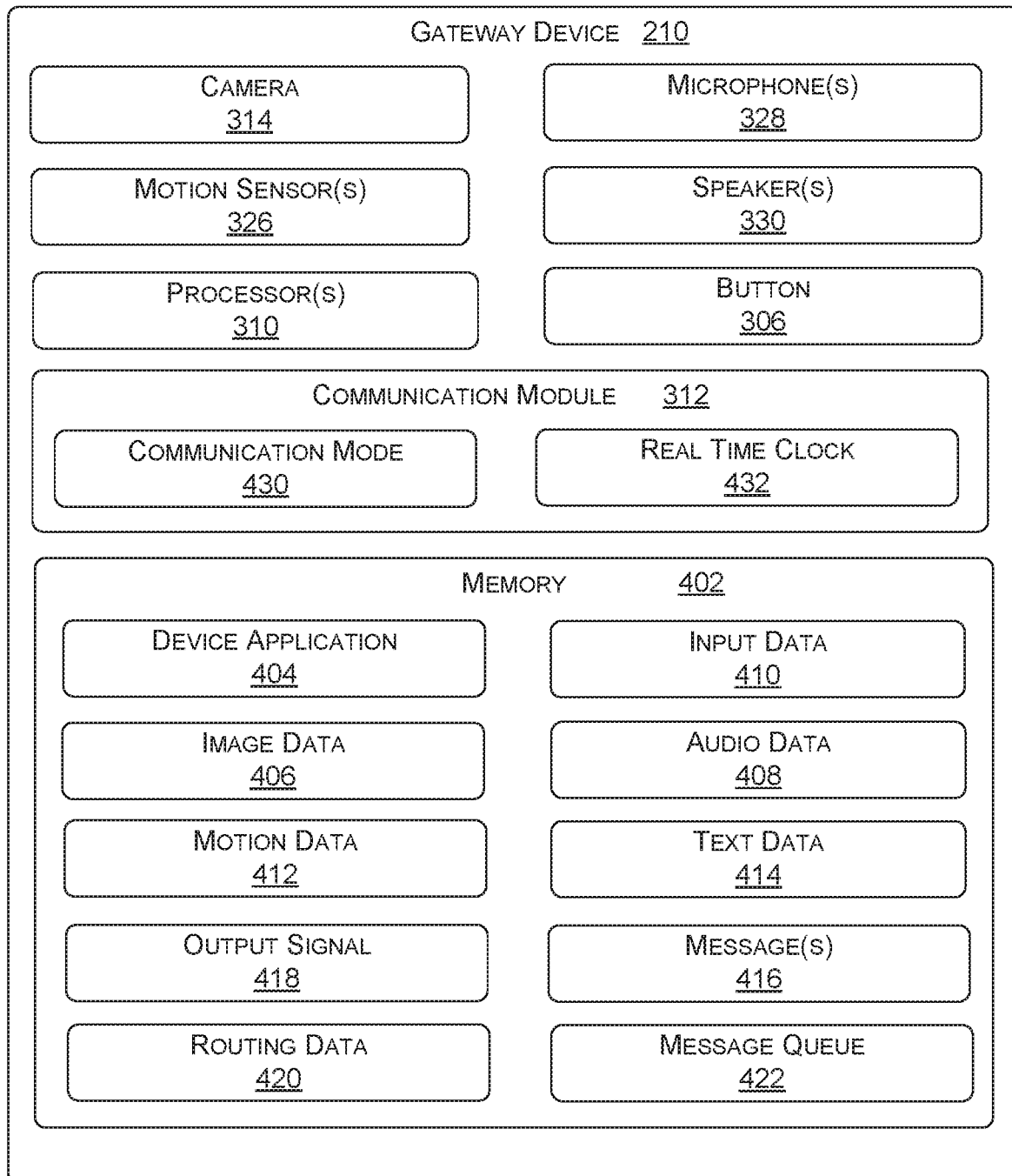
FIG. 4 is a functional block diagram illustrating an example embodiment of a gateway device, according to various aspects of the present disclosure.

FIG. 4 is another functional block diagram illustrating an embodiment of the gateway device 210 according to various aspects of the present disclosure. In some embodiments, the gateway device 210 may represent, and further include one or more of the components from, the A/V recording and communication doorbell 210(c), the A/V recording and communication security camera 210(a), and/or the floodlight controller 210(b). Additionally, in some embodiments, the gateway device 210 may omit one or more of the components shown in FIG. 4 and/or may include one or more additional components not shown in FIG. 4.

As shown in FIG. 4, the gateway device 210 includes memory 402, which may represent the volatile memory 322 and/or the non-volatile memory 324. The memory 402 stores a device application 404. In various embodiments, the device application 404 may configure the processor(s) 310 to record image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216 and endpoint devices 230, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the gateway device 210.

The device application 404 may further configure the communication module 312 and/or the processor(s) 310 to carry out a data rate-switching communication scheme with downlink message scheduling as described herein. For example, the device application may store instructions that, upon execution, cause the gateway device 210 to operate in accordance with the state flow diagram 700 shown and described below with respect to FIG. 7.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the gateway device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the gateway device 210 is not a doorbell (e.g., the video doorbell 210(c)), the gateway device 210 may not include the button 306, and the gateway device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the gateway device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the gateway device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, the communication module 312 of the gateway device 210 may store a communication mode 430, and may include a real time clock (RTC) 432. The communication mode 430 may represent the state of the gateway device 210 (e.g., low-power state, standby state, listening state, transmitting state, etc.), and/or may represent a group of repeating operations that collectively comprise a "mode" (e.g., a scheduled receive mode, a periodic listening mode, etc.). The RTC 432 may be a circuit or other local device that the gateway device 210 uses to determine the local time of the gateway device 210. The output of RTC 432 may be compared against timing information received from an endpoint device to determine a timing offset and aid in the synchronization of scheduled transmissions by the gateway device 210 with listening windows of the endpoint device 230.

In addition, the memory 402 of the gateway device 210 may store routing data 420 and a message queue 422. The routing data 420 may be a table or other data store in which the gateway device 210 stores information related to one or more endpoint devices. For example, an endpoint device may be associated with a unique identifier, a receive window time interval, a timing offset (e.g., the offset between the gateway device's RTC 432 and an endpoint device's RTC), and/or other information about the endpoint device. Some or all of this information may be transmitted in an uplink message to the gateway device 210 from an endpoint device, and the gateway device 210 may add or update the routing data 420 based on that received information. The message queue 422 may store downlink messages received, for example, from a server and associated with a particular device. However, the gateway device 210 may be busy or otherwise not ready to transmit a received downlink message immediately, and instead stores the downlink message into the message queue 422 for later transmission. Alternatively, and/or additionally, the gateway device 210 may generate scheduling information based on its availability and the timing information stored in the routing data 420 for the endpoint device associated with a received downlink message. That generated scheduling information (e.g., indicating the time at which to transmit a particular downlink message to a particular endpoint device) may be stored in the message queue 422, which the gateway device 210 may later access and perform the scheduled downlink message transmission to a respective endpoint device.

Figure 5:
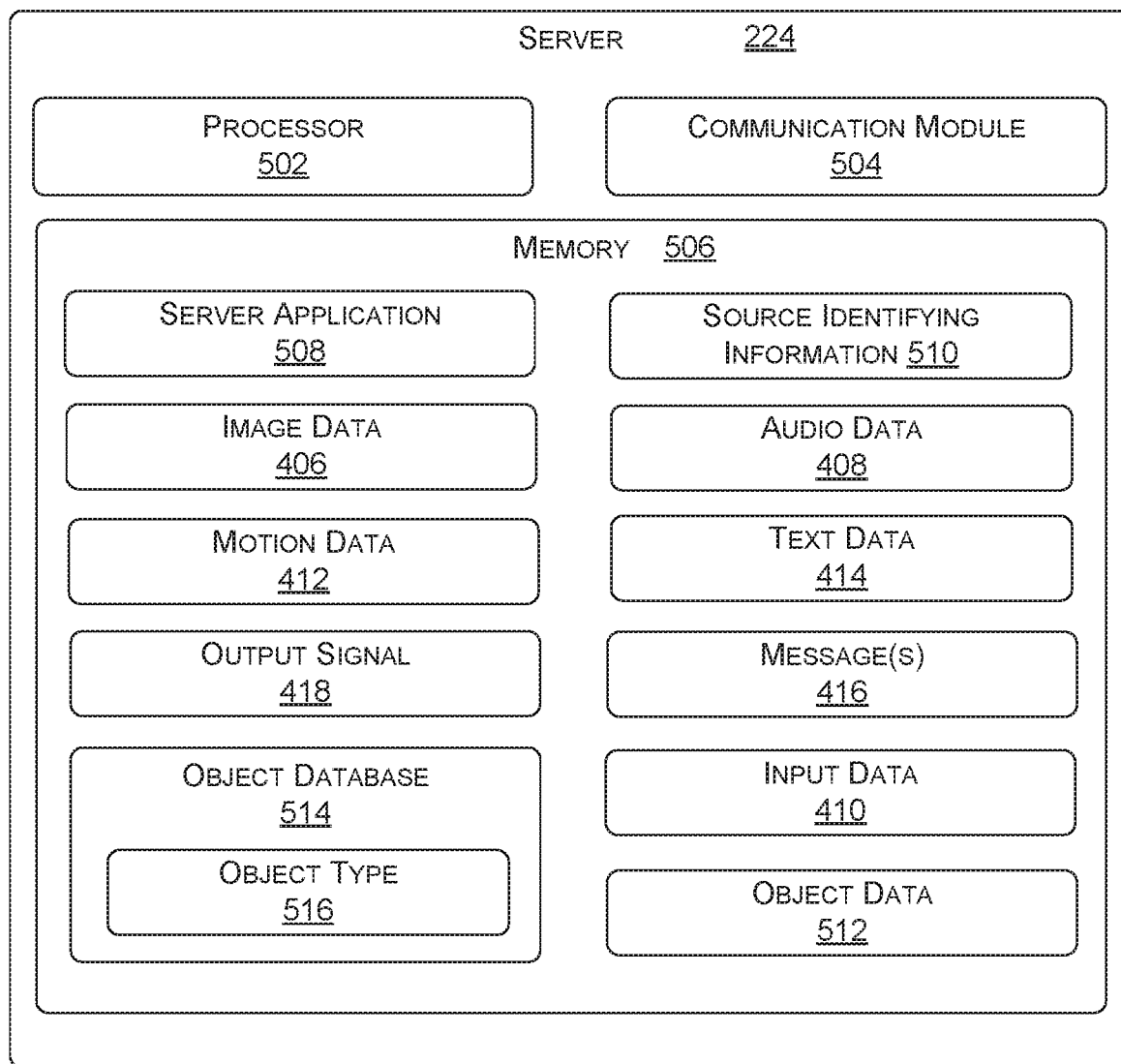
FIG. 5 is a functional block diagram illustrating one example embodiment of a server device, according to various aspects of the present disclosure.

FIG. 5 is a functional block diagram illustrating one embodiment of the server 224 according to various aspects of the present disclosure. The server 224, which may be similar to an "application server" as described herein, may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected either directly or indirectly to the network (Internet/PSTN) 212 (e.g., the gateway device 210, the hub device 202, the client devices 214, 216, a device controlled by the security monitoring service 228, and/or endpoint devices 230 by way of one or more gateway devices).

The memory 402 may include a server application 508 that configures the processor(s) 502 to receive and/or retrieve the audio data 408, the text data 414, the input data 410, the messages 416, the image data 406, and/or the motion data 412 from the gateway device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 and endpoint devices 230 using the communication module 504.

In some embodiments, the server application 508 may process received uplink messages routed via gateway devices 210 from endpoint devices 230 and, in some cases, generate a responsive downlink message that the server 224 transmits back to the respective endpoint devices 230 via the gateway devices 210. The server application 508 may be configured to execute a platform and/or service that involves accessing information from and/or transmitting commands to one or more endpoint devices 230. For example, a server application 508 may provide an animal locating service, which may involve estimating a location of an endpoint device coupled to an animal and providing access to that estimated location to a particular user (e.g., a user's client device or the like). As another example, a set of sensors may be implemented as endpoint devices at placed at various locations to collect information about an environment. The sensor information may be transmitted periodically from the endpoint devices to the server 224, and subsequently made available to one or more users to thereby provide an IoT sensor platform. Regardless of the particular server application used, it will be appreciated that the server 224 may serve as an application server through execution of one or more software routines of the server application 508 to provide access to endpoint devices that are not directly connected to the Internet (or, not directly connected to a network that is readily accessible or specific to a user).

Although referred to as the server 224 with reference to the processes described herein, the server 224 may additionally, or alternatively, include one or more of the devices from the network(s) of servers/backend devices 220. For example, the processes described herein with respect to the server 224 may additionally, or alternatively, at least in part, be performed by one or more APIs 226.

In further reference to FIG. 5, the memory 506 may also include source identifying data 510 that may be used to identify the gateway device 210, the hub device 202, the client devices 214, 216, and/or the endpoint devices 230. In addition, the source identifying data 510 may be used by the processor(s) 502 of the server 224 to determine the endpoint devices 230 are associated with the gateway device 210.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, and/or the text data 414.

As described herein, at least some of the processes of the gateway device 210, the hub device 202, and/or the client device 214, 216 may be executed by the server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the gateway device 210. In some examples, the processor(s) 502 of the server 224 may analyze the image data 406 whenever the server 224 receives the image data 406 from the gateway device 210.

In some examples, to analyze the image data 406, computer vision processing and/or image processing, as described herein, for example, may be performed by the processor(s) 502 of the server 224 to determine that the image data 406 depicts one or more objects. For example, in any of the present embodiments, the image data 406 generated by the gateway device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server 224 may compare the object data 512 to an object database 514 to determine what, if any, object(s) the image data 406 depicts in the field of view of the gateway device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparison, the processor(s) 502 of the server 224 may match the object data 512 from the image data 406 to the image data stored in the object database 514. The processor(s) 502 of the server 224 may then use the match to determine that the object data 512 represents an object and/or to determine the type of object 516 that the object data 512 represents. For example, if the processor(s) 502 of the server 224 matches the object data 512 from the image data 406 to image data stored in the object database 514 that represents a person, then the processor(s) 502 of the server 224 may determine that the image data 406 depicts an object and/or that the image data 406 depicts a person. In some examples, when the object data 512 represents multiple objects, the processor(s) 502 of the server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

The server 224 may also include a notification unit 520. The notification unit 520 may include any combination of hardware and/or software operable to generate notifications directed through client device applications, emails, and/or other messaging channels. The notification unit 520 may be configured to receive messages from endpoint devices 230, which may provide a basis for notifying a user (e.g., regarding updates related to endpoint device(s) associated with a user).

In some implementations, the operation of the notification unit 520 may depend upon user-specific configurations. For example, one user may wish to be notified if their pet's location is detected at an unexpected location or is not in close proximity to the user. However, another use may wish to disable such notifications, which may be a configurable aspect of the server application 508.

Although described as being performed in the server 224, in some embodiments, the image data 406 may be analyzed by any of the gateway device 210, the hub device 202, and/or the client device 214, 216 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 512, as described with reference to FIG. 5.

The gateway device 210 and the endpoint device 230 (and/or one any other device that implements WAN communication functionality) may alternatively be referred to herein as "network devices."

Figure 6:
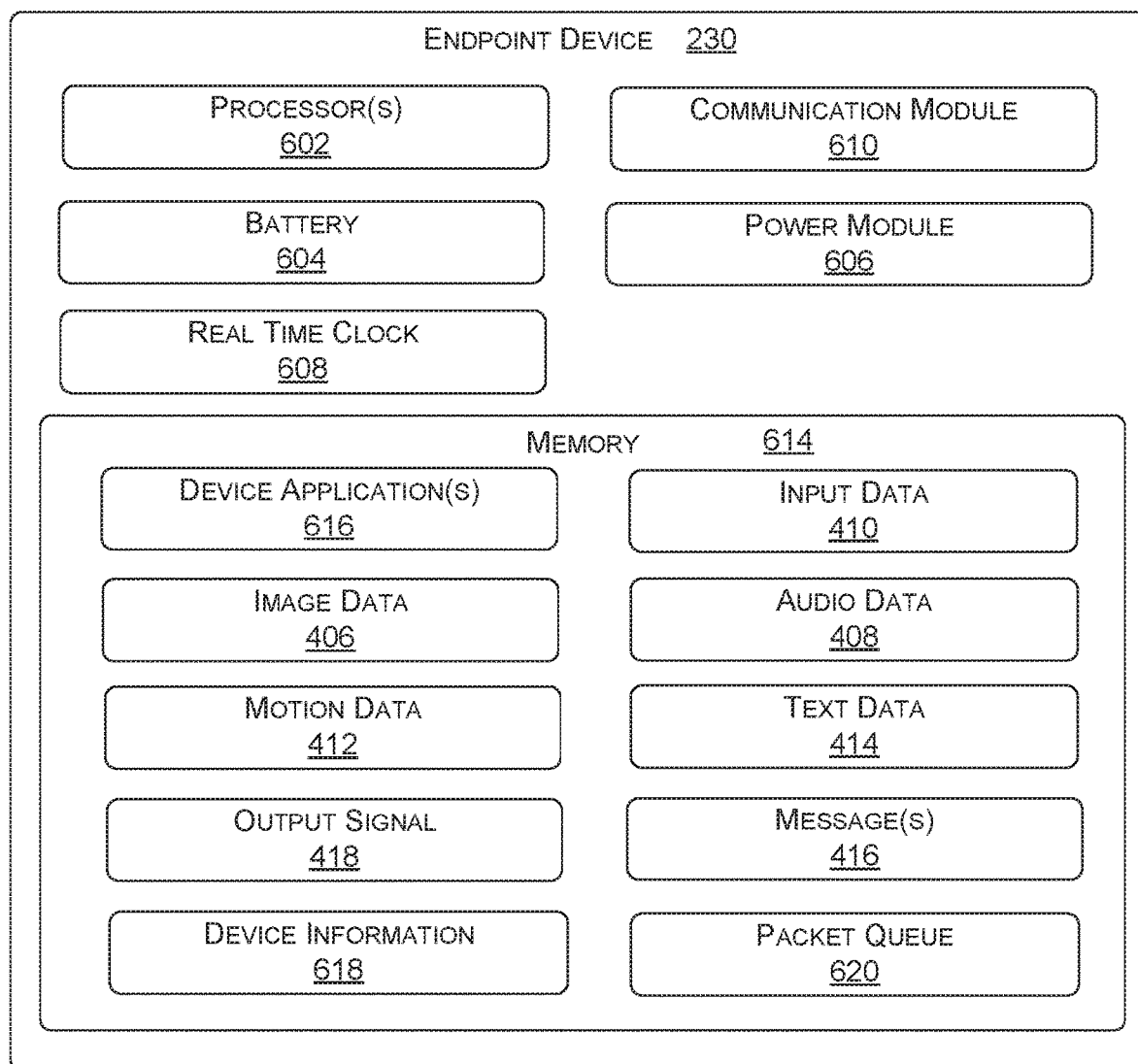
FIG. 6 is a functional block diagram illustrating one example embodiment of an endpoint device, according to various aspects of the present disclosure.

FIG. 6 is a functional block diagram illustrating an embodiment of an endpoint device 230, according to various aspects of the present disclosure. The endpoint device 230 may implement similar functionality as the client device 214, 216 described herein. In some cases, an endpoint device 230 may have extended functionality and hardware to perform operations such as image and video recording, capturing and storing sensor data, and/or other similar functionality. In other cases, an endpoint device 230 may provide more application-specific functionality, such as an embedded device application and long-range LPWAN communication capabilities. In example embodiments, an endpoint device 230 may comprise a wearable device executing an animal locating application (e.g., for a user's pet, for biological research, etc.). For example, the endpoint device 230 may be secured to a pet's collar, and may be capable of communicating with a network of gateway devices 120, 130, 142, 144, 146, 148 using a long-range LPWAN protocol.

In various embodiments, the endpoint device 230 may comprise processor(s) 602 (which may be similar to, and/or include similar functionality as, the processor(s) 310), which may be operatively connected to a communication module 610 (which may be similar to, and/or include similar functionality as, the communication module 312), and memory 614 (which may be similar to, and/or include similar functionality as, the memory 402). The communication module 610 may also implement aspects of the long-range LPWAN protocol of the present application.

The memory 614 may store device application(s) 616. In various embodiments, device application(s) 616 may configure the processor(s) 602 to receive input(s) to the input interface 604. In addition, device application(s) 614 may configure the processor(s) 602 to receive, using the communication module 610, the input data 410, the image data 406, the audio data 408, the output signal 418, and/or messages 416 from one or more of the gateway devices 210, the hub device 202, or the server 224.

The device application(s) 616 may also cause the endpoint device 230 to perform various operations, procedures, and/or modes. For example, the device application(s) 616 may include instructions to execute software routines that cause the endpoint device 230 to change power states (e.g., from a lower power state or standby mode to a higher power state or wake mode). The device application(s) 616 may include instructions to execute software routines that changes the endpoint device's 230 mode of operation (e.g., a standby mode, a scheduled receive mode, a periodic listening mode, an uplink transmission mode, etc.), with each mode of operation involving the performance of one or more actions in a sequence with one or more repetitions. In addition, the device application(s) 616 may capture information from sensors, perform computations or calculations, and/or otherwise generate data to be transmitting in an uplink message to the server 224 via the gateway device 210.

The memory 614 of the endpoint device 230 may also include device information 618 and a message queue 620. The device information 618 may include information specific to the endpoint device, such as a MAC address or other device identifier. The message queue 620 may be similar to the message queue 422 described above with respect to FIG. 4. For example, the device application(s) 616 may generate data to be transmitted in an uplink message at a later time, and that data may be stored in the message queue 620 (either as raw data, encoded data, and/or data embedded in a frame or packet).

The endpoint device 230 may include a battery 604 and a power module 606. The battery 604 may provide the primary source of power for the processor(s) 602, the communication module 610, the real time clock 608, and/or the memory 614, among other possible components of the endpoint device. The battery 604 may be rechargeable, or non-rechargeable, depending upon the particular implementation. The power module 606 may be controllable (e.g., via a firmware or software) to fully power, partially power, or terminate power to a particular subsystem of the endpoint device 230. For example, the processor(s) 602 may include more than one processor (e.g., a multi-core processor, multiple separate processors, a central processor and other special-purpose processors, big/little processor architectures, etc.), and the power module may selectively provide power to all or a subset of the available processors or cores. As another example, the communication module 610 may include one or more wireless communication radios, and the power module 606 may selectively power all, some, or none of those radios at a given point in time. In specific implementations, the endpoint device 230 may implement a timing circuit or reduced-functionality processor that can determine whether the real time clock 608 satisfies some criterial, at which point the power module 606 is controlled to power up one or more previously idle or low-power subsystems. In other cases, the power module 606 may modify operational aspects of the endpoint device 230 to either reduce power consumption or increase performance (e.g., reducing processor(s) 602 clock rates, memory's 614 clock rates, etc.).

Regardless of the particular implementation, the power module 606 may enable the endpoint device 230 to operate in two or more different power states. Although some disclosure of the present application describes a "lower power state" and a "higher power state," it will be appreciated that there may be varying gradations of power consumption, and that what is considered a "low-power state" may vary depending on the particular implementation and use case of the LPWAN protocol described herein.

The endpoint device 230 also includes a real time clock (RTC) 608, which may be similar to the RTC 438 of the gateway device 210 described above with respect to FIG. 4. The state of the RTC 608 may be obtained at or near the time when the endpoint device 230 transmits an uplink message (e.g., accessed directly by the communication module 610, and/or accessed by the processor(s) 602 in generating the uplink message), which may be at least partially encoded into the uplink message to facilitate messaging synchronization based on an offset (to the extent that one exists) between RTC 438 and RTC 608.

In some of the present embodiments, in response to receiving a message 416, the device application 616 may configure the processor(s) 602 to cause the display 618 to display the message 416. The message 416 may indicate that the gateway device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

Each of the processes described herein, including the processes 700, 800, 900, 1000, and 1100 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 7:
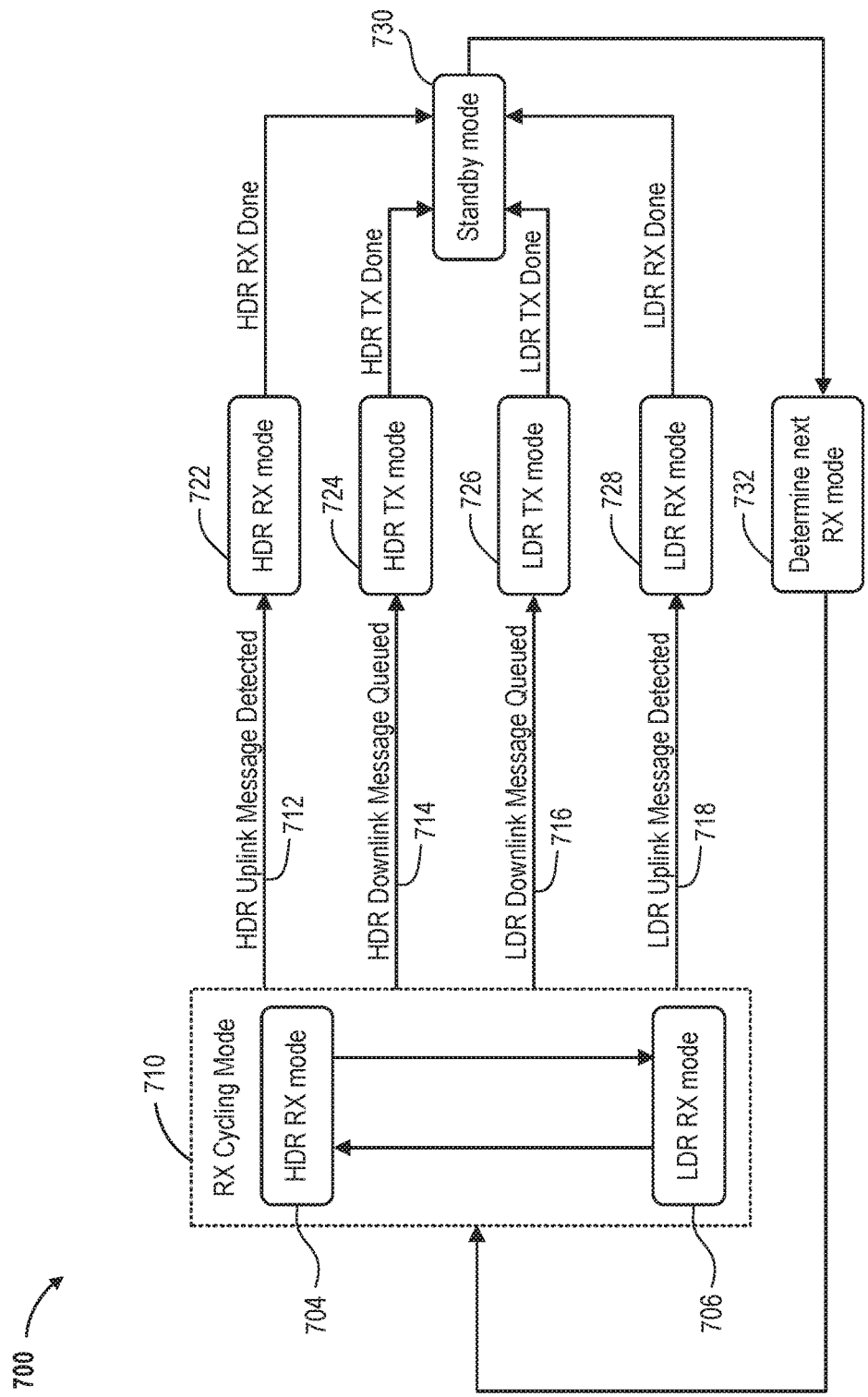
FIG. 7 is a state diagram illustrating an example process for data rate mode switching by a gateway device, according to various aspects of the present disclosure.

FIG. 7 is a state diagram 700 illustrating an example process for data rate mode switching by the gateway device 210, according to various aspects of the present disclosure. As described herein, an LDR receive mode may be referred to as an "LDR RX mode," an LDR transmit mode may be referred to as an "LDR TX mode," an HDR receive mode may be referred to as an "HDR RX mode," and an HDR transmit mode may be referred to as an "HDR TX mode." Although there is no "start" state in the state diagram 700, the gateway device 210 may begin operation at any of the states shown in FIG. 7, or any other state not shown in FIG. 7 (and subsequently transition to one of the states shown in FIG. 7).

At RX cycling mode 710, a gateway device 210 may transition between an HDR RX mode 704 and an LDR RX mode 706. In some implementations, the HDR RX mode 704 may continue for some duration of time (e.g., 1 ms (millisecond) to 30 ms, such as 2 ms to 10 ms, such as 4 ms, among other possible durations), then the LDR RX mode 706 may continue for some duration of time (e.g., 10 ms to 100 ms, such as 20 ms to 60 ms, such as 43 ms, among other possible durations), and subsequently may transition back to the HDR RX mode 704. In some cases, the LDR RX mode 706 duration may be longer than the HDR RX mode 704, to account for the longer transmission times in LDR RX mode 706 due to an increased spreading factor (when CSS modulation is used). If no messages are received from either the server 224 and/or an endpoint device 230, then the gateway device 210 may repeatedly cycle between the HDR RX mode and the LDR RX mode.

If an HDR uplink message 712 is detected during the RX cycling mode 710 (e.g., from a gateway device or other device capable of HDR communication), then the gateway device 210 may transition to a longer duration HDR RX mode 722 to enable the gateway device 210 to receive the entire HDR uplink transmission. Once the entire HDR uplink message has been received, then the gateway device 210 may transition to a standby mode 730. The standby mode 730 may involve waiting or determining the next available HDR RX mode or LDR RX mode (state 732) is set to begin, at least in embodiments where the HDR RX mode 704 and the LDR RX mode 706 are set to occur at specific time intervals (e.g., for synchronization with endpoint devices). The HDR uplink message 712 may also be transmitted to the server 224 (not shown).

If an HDR downlink message 714 is received from the server 224 during the RX cycling mode 710, then the gateway device 210 may transition to an HDR TX mode 724 to enable the gateway device 210 to transmit some or all of the HDR downlink message 714 to its respective device. The transmission may occur in a scheduled or unscheduled manner, as described herein. Once the HDR downlink message has finished transmitting, the gateway device 210 may transition to a standby mode 730.

If an LDR uplink message 718 is detected during the RX cycling mode 710 (e.g., from the gateway device 210 or other device capable of LDR communication), then the gateway device 210 may transition to a longer duration LDR RX mode 728 to enable the gateway device 210 to receive the entire LDR uplink transmission. Once the entire LDR uplink message has been received, then the gateway device 210 may transition to a standby mode 730. The LDR uplink message 718 may also be transmitted to the server 224 (not shown).

If an LDR downlink message 716 is received from the server 224 during the RX cycling mode 710, then the gateway device 210 may transition to an LDR TX mode 724 to enable the gateway device 210 to transmit some or all of the LDR downlink message 716 to its respective device. The transmission may occur in a scheduled or unscheduled manner, as described herein. Once the LDR downlink message has finished transmitting, the gateway device 210 may transition to a standby mode 730.

Although the state diagram 700 does not specifically indicate any particular timing, it should be understood that transitions from one state or mode to another may occur either asynchronously, or according to a particular timing. For example, a transition to LDR RX mode 726 may not occur immediately after the LDR downlink message 716 is detected, but rather at a point in time at or near when the endpoint device associated with the LDR downlink message 716 is awake and is listening for the LDR downlink message 716. Timing considerations are described in more detail above and below with respect to FIGS. 9A to 9C.

Figure 8:
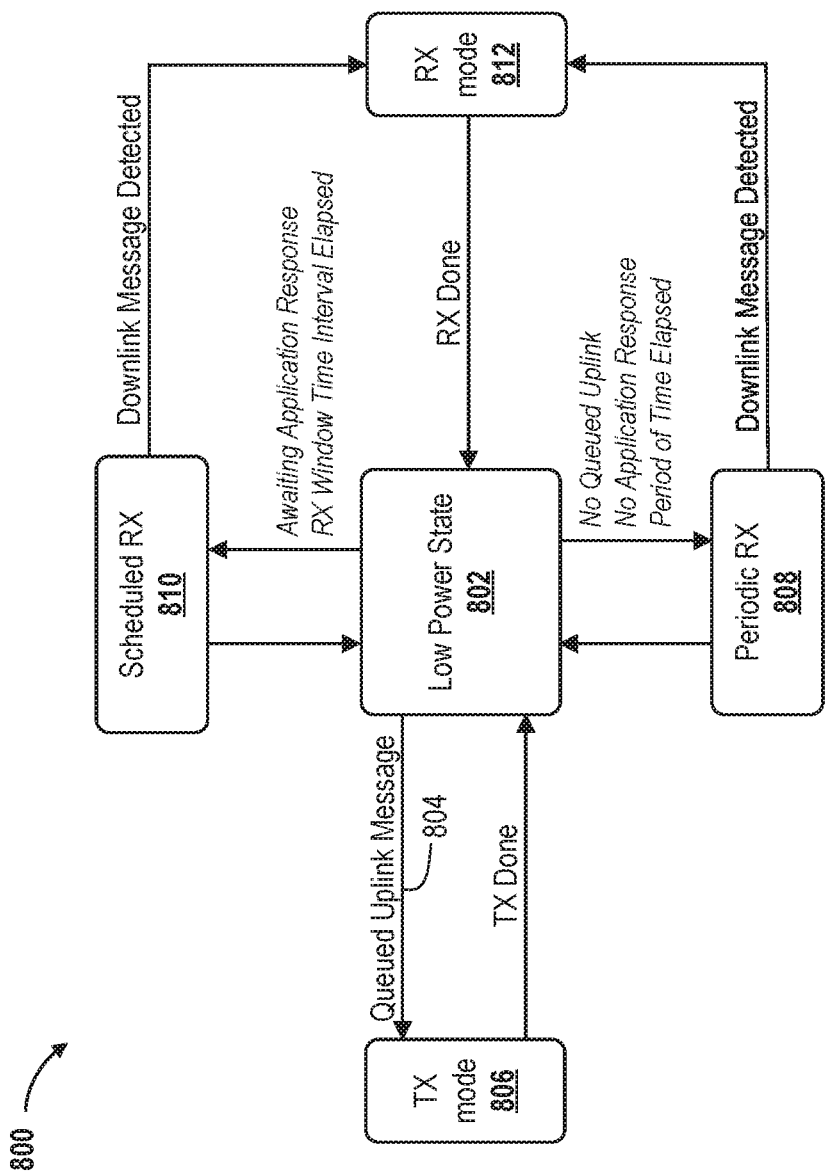
FIG. 8 is a state diagram illustrating operations of an example communication application, according to various aspects of the present disclosure.

FIG. 8 is a state diagram 800 illustrating operations of an example communication application executed on the endpoint device 230, according to various aspects of the present disclosure. In this example, the endpoint device 230 may default to a low-power state 802, unless a particular action or communication event is scheduled to occur. For example, if the endpoint device 230 generates an uplink message for transmission to a server, the endpoint device 230 may transition from the low-power state 802 to the TX mode 806 to facilitate that uplink transmission. Once the uplink transmission is complete, the endpoint device 230 may transition back to the low-power state 802.

If the transmitted uplink message included a request for an application response, the endpoint device 230 may initiate a scheduled receive mode based on a receive window time interval, whereby the endpoint device 230 transitions to and from the scheduled RX state 810 one or more times. Initially, the endpoint device 230 enters the low-power state 802. After the RX window time interval has elapsed, the endpoint device 230 transitions to the scheduled RX state 810, which may involve powering up a wireless radio and listening for a downlink message for some duration of time, such as a dwell period. If no downlink message is detected during that dwell period, the endpoint device 230 may transition back to the low-power state 802. However, if a downlink message is detected during the scheduled RX state 810, the endpoint device 230 may remain in the powered-up state and transition to RX mode 812 to complete the receipt of the downlink message transmission. Once the entire downlink message has been received, the endpoint device 230 transitions back to the low-power state 802.

If no uplink messages are awaiting transmission, and the endpoint device 230 is not awaiting a downlink transmission, then the endpoint device 230 may remain in the low-power state 802 for a period of time. Once that period of time has elapsed, the endpoint device 230 may transition to a periodic RX state 808, which may be similar to the scheduled RX state 810. If no downlink message is detected during the periodic RX state 808, the endpoint device 230 may transition back to the low-power state. Collectively, the cycle between the low-power state 802 and the periodic RX state 808 may be referred to as a "periodic listening mode." In some implementations, the period of time between each cycle of the periodic listening mode may be longer than the scheduled RX mode (e.g., because the endpoint device 230 is not expecting a transmission, the endpoint device 230 may remain in a low-power state for longer so as to further reduce power consumption).

Although FIG. 8 illustrates a particular state diagram 800, it should be understood that more or fewer states may be implemented on an endpoint device 230, depending upon the particular implementation. For example, the endpoint device 230 may include additional transition lines extending from the scheduled RX state 810 and/or the low-power state 802 to account for expiration conditions other than the detection of a downlink message, such as reaching or surpassing a threshold number of scheduled receive mode cycles, meeting or exceeding a threshold duration of time in the scheduled receive mode, the battery level of the endpoint device 230 falling below a threshold level, and/or other possible expiration conditions.

In various embodiments, the threshold number of scheduled receive mode cycles may be equal to any positive integer greater than zero, such as 3 cycles, or 4 cycles, or 5 cycles, or 6 cycles, or 7 cycles, etc. In various embodiments, the threshold duration of time for the receive mode may be greater than 1 second, such as 5 seconds to 5 hours, or between 30 seconds to 30 minutes, among other possible thresholds. In various embodiments, the threshold battery level of the endpoint device may be equal to 50%, 40%, 30%, 20%, 10%, and/or some combination thereof, among other possible threshold battery levels.

As one example, an endpoint device with a battery level at 11% may transmit an uplink message and enter into scheduled receive mode for a period of 5 minutes. If, after 3 minutes has elapsed, the endpoint device's battery falls below 10%, the endpoint device may perform up to five additional wake cycles before exiting the scheduled receive mode and switching to a periodic listening mode. Accordingly, the endpoint device may exit the scheduled receive mode before the initial period of 5 minutes has elapsed, as the transition from above 10% battery power to below 10% battery power might cause the endpoint device to change the threshold duration of time or threshold number of cycles of the scheduled receive mode. As another example, an endpoint device with a battery level at 52% may transmit an uplink message and enter into scheduled receive mode for a period of 10 minutes. If, after 4 minutes has elapsed, the endpoint device's battery falls below 50%, the endpoint device may reduce the remaining time in the scheduled receive mode from 6 minutes to 60 seconds. In this manner, the duration of a scheduled receive mode may change dynamically, based on the available battery capacity of the endpoint device. It will be appreciated that other scheduled receive mode cycles, threshold durations of time for the receive mode, and/or threshold battery levels of the endpoint device may be used, depending on the particular implementation.

Figure 9A:
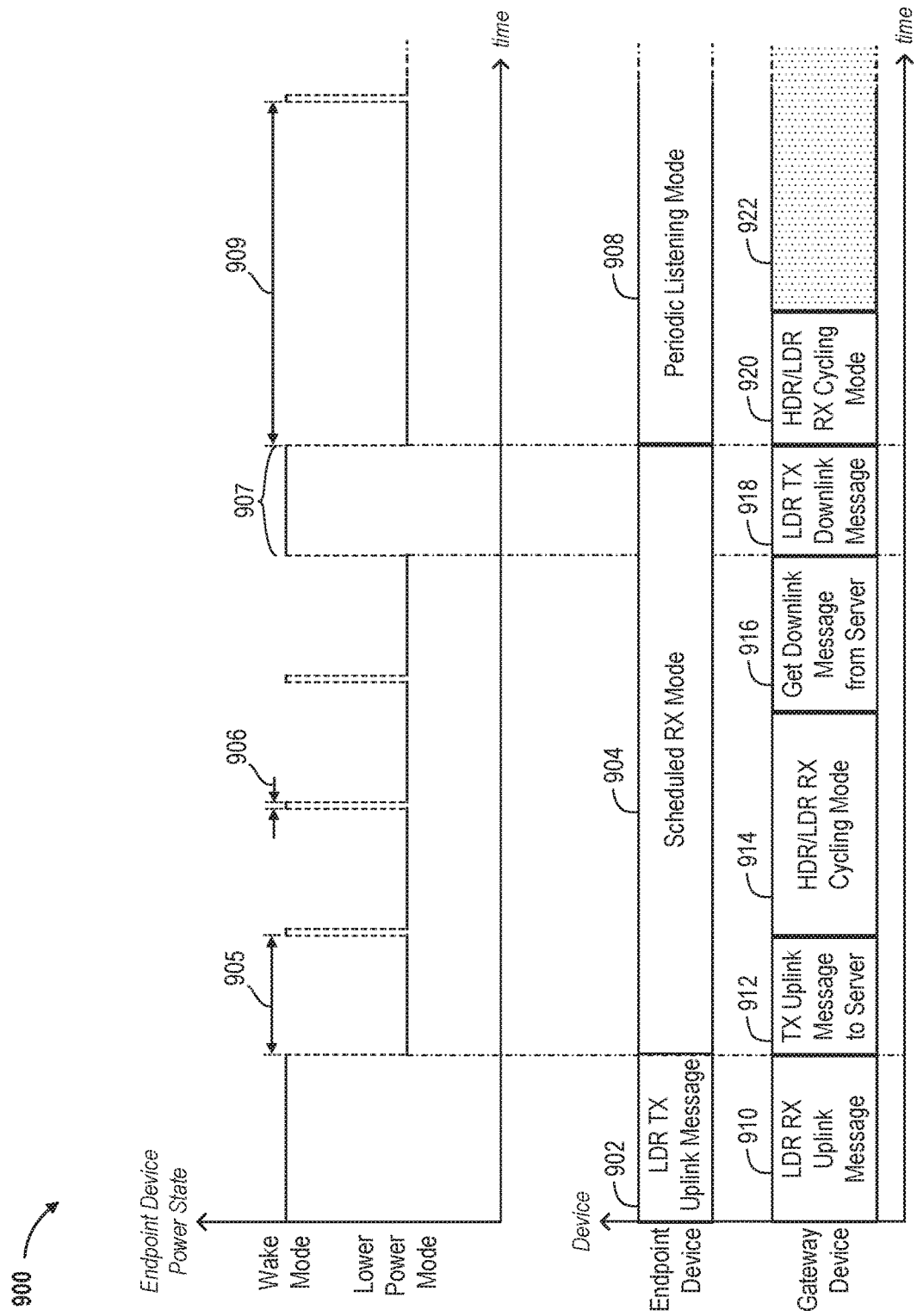
FIGS. 9A through 9C are schematic timing diagrams illustrating example process flows for an endpoint device and a gateway device, according to various aspects of the present disclosure.
Figure 9B:
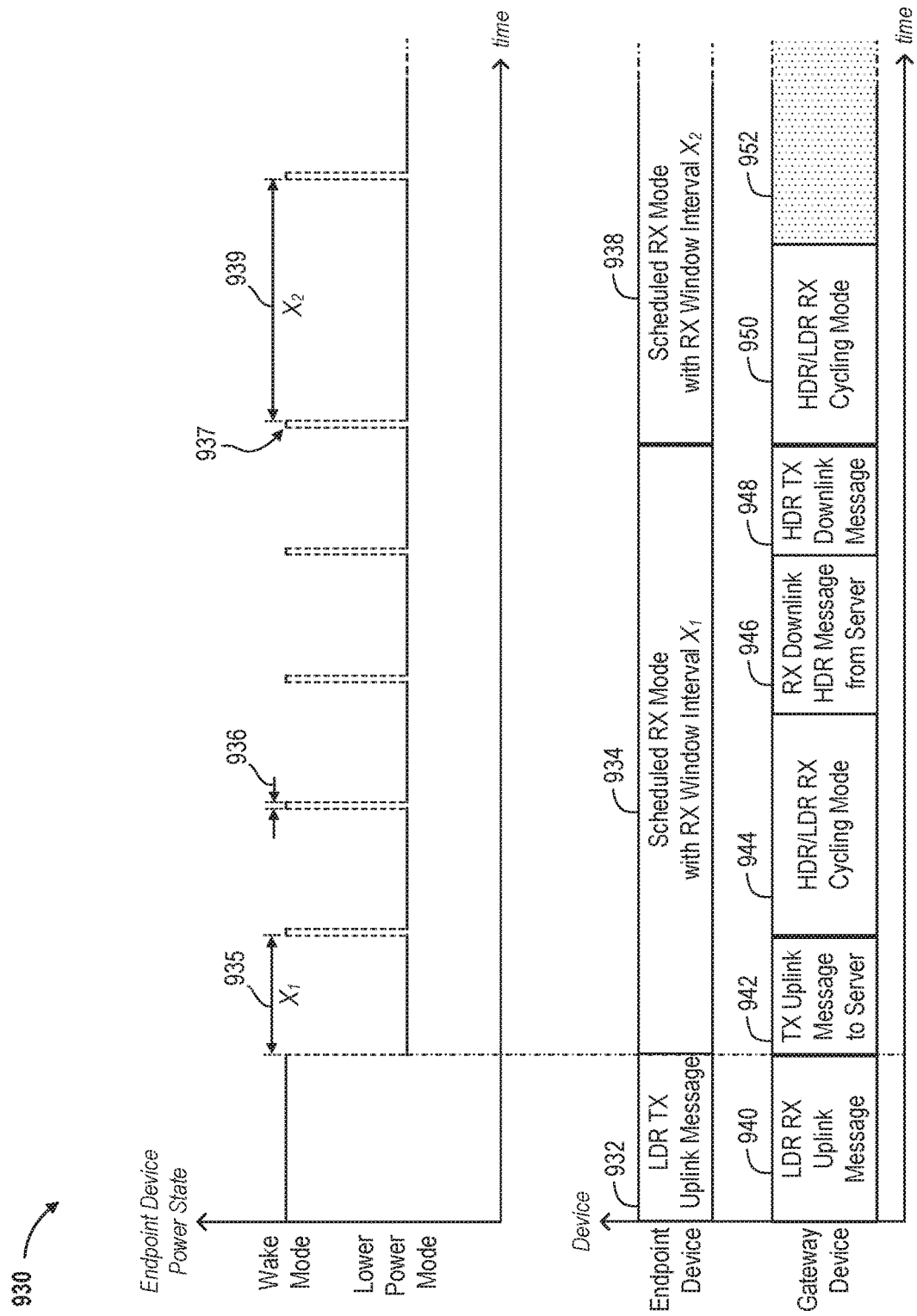
Figure 9C:
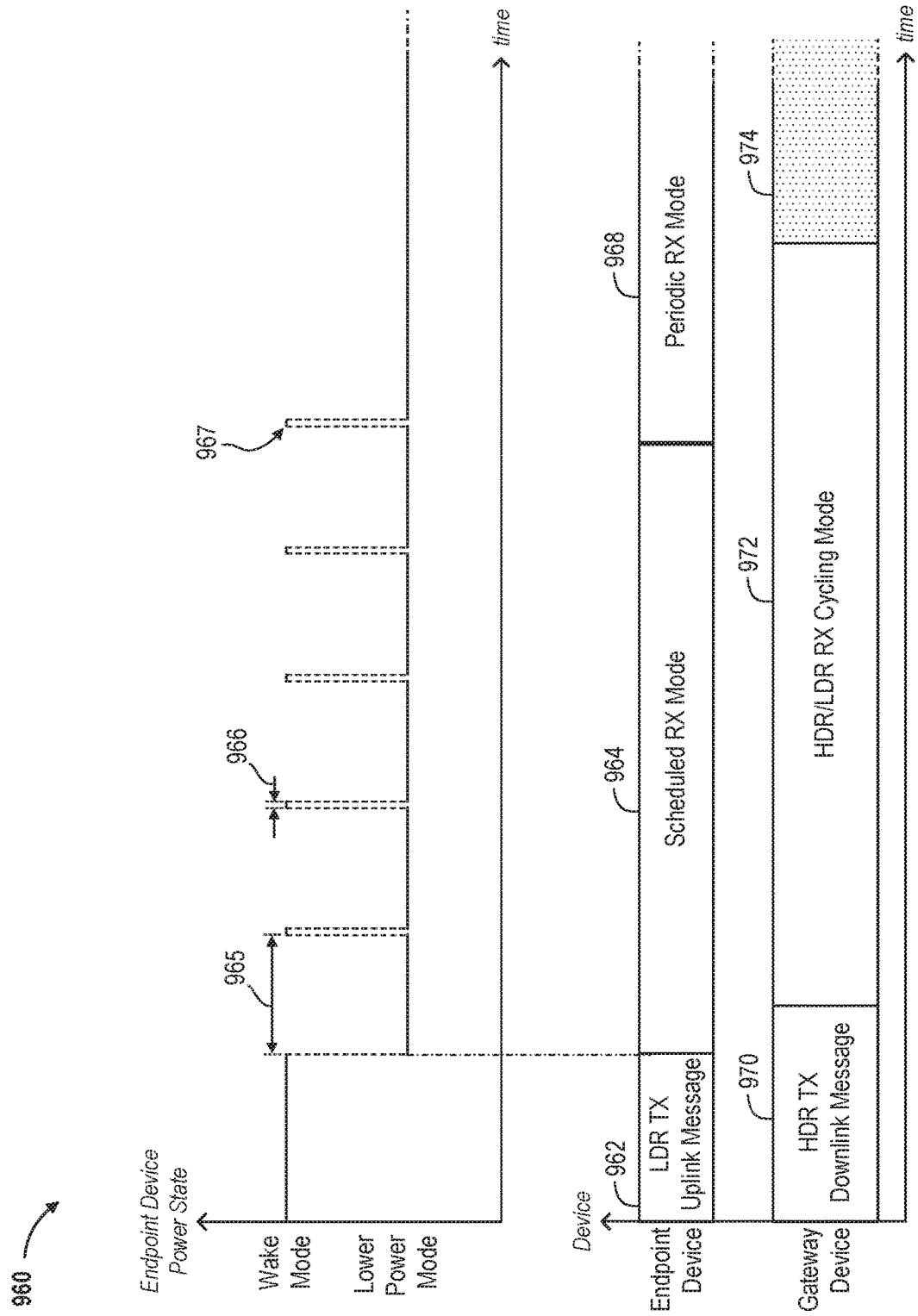

FIGS. 9A through 9C depict schematic timing diagrams illustrating example process flows for the endpoint device 230 and the gateway device 210, according to various aspects of the present disclosure. Each of FIGS. 9A through 9C illustrates an example scenario, and aligns the timing of the power state transitions of the endpoint device 230 with events or states of the endpoint device 230 and the gateway device 210. It should be understood that the timing diagram may not necessarily be drawn to scale, such that actual durations may be longer or shorter than they appear in the timing diagram. In addition, actual timing of events between the endpoint device 230 and the gateway device 210 in various implementations may not precisely align in accordance with the timing diagrams shown in FIGS. 9A through 9C.

Referring to FIG. 9A, the endpoint device 230 begins by performing an LDR TX 902 of an uplink message to the gateway device 210. During the LDR TX 902, the endpoint device 230 may be in a "wake" mode (e.g., with the wireless radio being powered up and actively transmitting information). The uplink message may contain information related to the endpoint device's 230 timing, such as the receive window time interval 905, the dwell period 906, the endpoint device's 230 RTC clock value at the time of transmission, and/or other information. Also during the LDR TX 902, the gateway device 210 carries out an LDR RX mode to receive the uplink message from the endpoint device 230.

After the LDR TX 902 has completed, the endpoint device 230 transitions to a low-power mode for the receive window time interval 905 and initiates a scheduled RX mode 904. After the receive window time interval 905 has elapsed, the endpoint device 230 transitions to a wake mode and listens for an LDR downlink message for a dwell period 906. In this example, the endpoint device 230 listens for an LDR message for three intervals without detecting a downlink message.

While the endpoint device 230 is in the scheduled RX mode 904, the gateway device 210 transmits the received uplink message as an uplink message to a server. After that transmission has completed (or, in some implementations, in parallel with that transmission), the gateway device 210 may cycle between HDR RX and LDR RX modes (see mode 710 shown in FIG. 7). After the server has received and processed the uplink message, it may transmit a response message back to the gateway device 210, at which point the gateway device 210 obtains the downlink response message at state 916 for the endpoint device 230. In this example, the gateway device transitions to an LDR TX mode and transmits the downlink response message at state 918 to the endpoint device 230. At or near that same time, the endpoint device 230 transitions to the wake mode, begins listening for the LDR downlink message, and detects the start of the transmission.

Upon detecting the start of the LDR downlink transmission, the endpoint device 230 remains in the wake mode to continue receiving the remainder of the LDR downlink message from the gateway device 210. Once the LDR downlink transmission has completed, the endpoint device 230 may transition back to the low-power mode for a period of time 909 and enter a periodic listening mode 908. The periodic listening mode 908 may be similar to the scheduled LX mode 904, but with a low-power period 909 that is longer than the receive window time interval 905.

The gateway device 210 may, after completing the LDR downlink transmission, return to the HDR/LDR RX cycling mode 920, and/or perform other actions 922 (e.g., HDR or LDR RX or TX to and from various other devices).

FIG. 9B illustrates a similar scenario to that shown and described with respect to FIG. 9A. However, in the example of FIG. 9B, the endpoint device 230 reaches an expiration condition after five scheduled RX mode cycles, after which the endpoint device 230 increases the receive window time interval to reduce power consumption as the endpoint device 230 awaits an application response downlink message. Like in FIG. 9A, the endpoint device 230 begins by performing an LDR TX 932 of an uplink message to the gateway device 210, and the gateway device 210 simultaneously carries out an LDR RX mode 940 to receive the uplink message from the endpoint device 230.

After the LDR TX 902 has completed, the endpoint device 230 transitions to a low-power mode for a receive window time interval 935 ($X_1$) and initiates a scheduled RX mode 904. After the receive window time interval 935 has elapsed, the endpoint device 230 transitions to a wake mode and listens for an LDR downlink message for a dwell period 936. In this example, the scheduled RX mode cycle repeats 5 times with the receive window time interval 935 ($X_1$).

While the endpoint device 934 is in the scheduled RX mode, the gateway device 210 transmits the received uplink message to the server at state 942, carries out HDR/LDR RX cycles at state 944, and performs some HDR downlink message receiving and transmitting operations for a different device at states 946 and 948. However, unlike the example in FIG. 9A, the gateway device 210 does not receive the LDR downlink response message from the server (at least for the period of time shown in FIG. 9B).

By the fifth wake and listen period 937, the endpoint device 230 determines that five listening attempts have completed and that no downlink message has been detected. In this example, the endpoint device 230 may be configured to have a comparatively shorter RX window interval ($X_1$) for the first five scheduled RX mode cycles to provide reduced latency if the uplink and downlink operations are completed without delay or issues. However, in the situation shown in FIG. 9B, the server has not completed processing the uplink message, and has not transmitted the downlink response message to the gateway device 210 by the end of the fifth cycle of the scheduled RX mode 934. As a result, the endpoint device 230 determines that an expiration condition has been met, terminates the scheduled RX mode 934, and initiates scheduled RX mode 938 with a longer RX window interval 939 ($X_2$) compared to the initial RX window time interval 935 ($X_1$). In this manner, the endpoint device 230 may reduce its power consumption as it waits for the downlink response message.

In various embodiments, the duration of the RX window time interval 935 for LDR transmissions may be at least 16 milliseconds (ms), such as 16 ms to 50 ms, such as 16.384 ms, among other possible durations. For HDR transmissions, the duration of the RX window time interval 935 may be at least 1 ms, such as 1 ms to 10 ms, such as 1.024 ms, among other possible durations. In the example scenario shown and described with respect to FIG. 9B, the duration of the RX window time interval 939 may increase relative to the duration of the RX window time interval 935. For example, the RX window time interval 939 for LDR transmissions may be at least 32 ms, such as 32 ms to 1000 ms, among other possible durations. As another example, the RX window time interval 939 for HDR transmissions may be at least 2 ms, such as 2 ms to 60 ms, among other possible durations. It will be appreciated that other RX window time intervals may also be possible, depending on the particular implementation.

In various embodiments, a drop in battery level from above a particular battery level threshold to below that particular battery level threshold may cause the endpoint device to increase the RX window time interval. For example, if an endpoint device in a scheduled receive mode with an RX window time interval of 16 ms drops in battery power from 51% to 49% (e.g., below a 50% threshold), the endpoint device may increase the length of the RX window time interval to 32 ms, 48 ms, or 64 ms, among other durations. As another example, if an endpoint device in a scheduled receive mode with an RX window time interval of 32 ms drops in battery power from 21% to 19% (e.g., below a 20% threshold), the endpoint device may increase the length of the RX window time interval to 64 ms, 128 ms, or 256 ms, among other durations. As yet another example, if an endpoint device in a scheduled receive mode with an RX window time interval of 64 ms drops in battery power from 110% to 9% (e.g., below a 10% threshold), the endpoint device may increase the length of the RX window time interval to 128 ms, 256 ms, or 512 ms, among other durations. Other changes in duration are also possible. In some examples, the RX window time interval may be 5 seconds when an endpoint device's battery level is above 40%, may be 10 seconds when an endpoint device's battery level is at or below 40% and above 20%, and may be 60 seconds when the endpoint device's battery level is at or below 20% and above 10%. In some embodiments, if the battery level of the endpoint device falls below 10%, the endpoint device may set the receive window time interval to the duration of time it takes to perform 2-10 scheduled receive mode cycles. Other thresholds and durations are also possible.

As another example, if an endpoint device in a scheduled receive mode with an RX window time interval of 1 ms drops in battery power from 51% to 49% (e.g., below a 50% threshold), the endpoint device may increase the length of the RX window time interval to 2 ms, 3 ms, or 4 ms, among other durations. As another example, if an endpoint device in a scheduled receive mode with an RX window time interval of 2 ms drops in battery power from 21% to 19% (e.g., below a 20% threshold), the endpoint device may increase the length of the RX window time interval to 4 ms, 6 ms, or 8 ms, among other durations. As yet another example, if an endpoint device in a scheduled receive mode with an RX window time interval of 4 ms drops in battery power from 11% to 9% (e.g., below a 10% threshold), the endpoint device may increase the length of the RX window time interval to 10 ms, 30 ms, or 50 ms, among other durations. Other changes in duration are also possible.

In some cases, the change in an RX window time interval due to a drop in battery power may be an increase by a factor of 2, 3, 4, or some other whole number. However, in other cases, the increase in the RX window time interval may be by some predetermined amount (and/or a respective predetermined amount associated with the particular drop in battery level). Regardless of the particular amount by which the RX window time interval is changed, the endpoint device may transmit an uplink message to a gateway device containing information related to the RX window time interval change, such that the gateway device may remain apprised of the endpoint device's availability to receive downlink messages (as the change in the RX window time interval affects the windows of time during which the endpoint device is listening for downlink messages).

Although specific duration changes are described above with respect to specific battery level threshold, it will be appreciated that the changes in RX window time intervals and the battery level thresholds may vary among different implementations.

As described herein, the term "receive window time interval" may refer to a duration of time beginning at or near the moment that an endpoint device transitions from a higher power state to a lower power state, and ending at or near the moment that the endpoint device transitions from the lower power state to the higher power state. In some cases, the term "receive window time interval" may alternatively refer to a duration of time beginning at or near the moment that an endpoint device transitions from a higher power state to a lower power state, continuing through the transition from the lower power state to the higher power state, and ending at or near the moment that the endpoint device transitions from the higher power state back to the lower power state. In further cases, the term "receive window time interval" may alternatively refer to the duration of time beginning at or near the moment that an endpoint device transitions from a lower power state to a higher power state (e.g., the dwell period), continuing through the transition from the higher power state to the lower power state, and ending at or near the following transition from the lower power state to the higher power state. With respect to FIG. 9B, the term "receive window time interval" may encompass both the RX window time interval 935, as well as the listening period immediately following the RX window time interval 935. In other cases, the receive window time interval may refer to the RX window time interval 935 as illustrated in FIG. 9B, without the listening period immediately following the RX window time interval 935. Moreover, the term "receive window time interval" does not necessarily refer to an absolute point in time, but rather refers to a given period of time elapsed during a scheduled receive mode that at least partially defines the period or periods at which the endpoint device transitions to a listening mode, to enable a gateway device to transmit scheduled downlink messages that synchronize with at least one of the scheduled listening periods of the endpoint device.

FIG. 9C illustrates yet another example scenario, in which the gateway device 210 fails to detect the endpoint device's 230 LDR uplink message transmission, due to the gateway device 210 performing an HDR TX downlink operation 970 while the endpoint device 230 transmits its LDR uplink message. Similar to the example of FIG. 9B, the endpoint device 230 in this example may be configured to perform five scheduled RX mode cycles (with an RX window time interval 965 and a dwell period 966) before exceeding a maximum retry threshold expiration condition at the end of listening period 967. However, in the example of FIG. 9C, the endpoint device 230 does not restart the scheduled RX mode 964 with a longer RX window time interval, but rather ends the scheduled RX mode and initiates a periodic RX mode 968 (e.g., inferring that the LDR TX uplink failed and terminating the scheduled RX mode after a threshold number of cycles). In some cases, the duration of the low-power mode between listening modes in the periodic RX mode 968 may be substantially longer than the RX window time interval 965, so as to reduce power consumption by the endpoint device 230.

Figure 10:
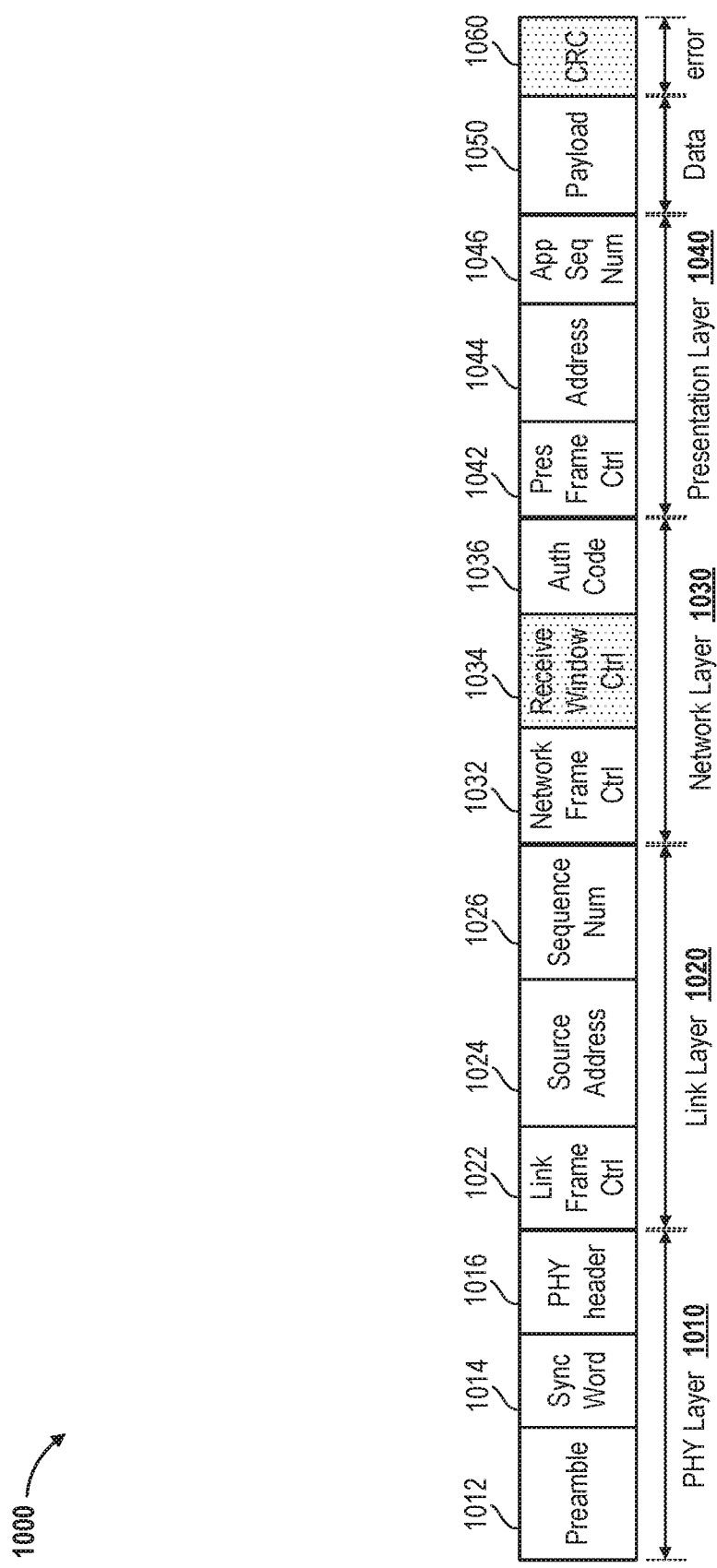
FIG. 10 is a schematic diagram illustrating an example uplink message, according to various aspects of the present disclosure.

FIG. 10 is a schematic diagram 1000 illustrating an example message structure for communication across the LPWAN protocol of the present application, according to various aspects of the present disclosure. The message may be a series of bits that represent information about an endpoint device, a destination device, timing information, a payload that may include data and/or commands, and error correction bits, among other possible information. An example message structure includes a physical (PHY) layer 110, a link layer 1020, a network layer 1030, a presentation layer 1040, a payload 1050, and error bits 1060.

The PHY layer 1010 may include a preamble 1012, a sync word 1014, and a PHY header 1016. The preamble 1012 may encode bits that are used to synchronize a wireless radio to the subsequent encoded signals. The sync word 1014 may encode a known sequence of bits or bytes that represents the start of a data message. The PHY header 1016 may encode various information to facilitate the physical transmission and receipt of information between gateway devices and/or endpoint devices.

The link layer 1020 includes a link frame control field 1022, a source address field 1024, and a sequence number 1026, which may be used to specify device-specific identification information (e.g., a MAC address or other unique device identifier). The sequence number 2016 may indicate that the frame is one of a series of frames (e.g., where data does not fit within the payload 1050 and requires multiple separate transmissions to convey) and specify which frame in the series it is. The link frame control 1022 may indicate whether or not an application response from a server is requested, and whether or not a receive window time interval is present within the network layer 1030, among other indications. In addition, the link frame control 1022 may include a "direction" bit or bits that indicate(s) whether the message is directed to a server, or whether the message is directed to an endpoint device. The inclusion of such direction bit(s) in a message may also inform a gateway device whether or not the receive window control field 1034 (described below) is included (e.g., in an uplink message from an endpoint device to a gateway device) or omitted (e.g., in a downlink message from a gateway device to an endpoint device). In an example implementation, the link frame control 1022 may include a source format bit (e.g., where 0 represents that the message originated from a server, and 1 represents that the message originated from an endpoint device), and a destination bit (e.g., where 0 represents that the message is destined for a server, and 1 represents that the message is destined for an endpoint device). Other bits and representation of those bits are also possible.

The network layer 1030 includes a network frame control field 1032, a receive window control field 1034, and an authorization code 1036. The receive window control field 1034 may encode information such as whether the transmitting device is starting or stopping a periodic receive window, and the duration of a receive window time interval. Using this receive window control field 1034, an endpoint device may convey to a gateway device and/or the server timing information needed to facilitate scheduled downlink transmissions (or otherwise convey that the endpoint device is terminating a scheduled receive mode). In an uplink message from an endpoint device, the network frame control field 1032 may include one or more bits that indicate whether the receive window control field 1034 is included or omitted in the message (e.g., with 0 indicating that the receive window control field 1034 is omitted, and 1 indicating that the receive window control field 1034 is included, among other possible indications). As described herein, an "indication of a receive window time interval" may refer to one or more bits in, for example, the network frame control field 1032 indicating that the receive window control field 1034 (which includes the receive window time interval) is present in the uplink message. In addition, the one or more bits that may be included in the network frame control field 1032 might also indicate that a previous receive window time interval has been terminated, in that a gateway device receiving the uplink message may replace whatever receive window time interval information it previously stored with an updated receive window time interval.

The presentation layer 1040 includes a presentation frame control field 1042, an address field 1044, and an application sequence number 1046. The address 1044 may be a destination address or other identifier indicating the destination of the message. In an uplink message from an endpoint device, the presentation frame control field 1042 may include one or more bits that indicate whether a response to the uplink message (e.g., a downlink message response) is requested by the endpoint device. For example, a bit or flag set to zero may indicate that no server response is requested, whereas the same bit or flag set to one might indicate that a server response is requested.

The payload 1050 may represent data, instructions, commands, and/or other information directed to the destination device. The length of the payload 1050 may vary among different applications, and may itself have a variable length depending on the contents of the message being transmitted. As described above, the payload 1050 may include error correcting bits, which enable a receiving device to determine whether transmission errors had occurred (e.g., due to signal interference, a weak signal, etc.). The number of error correcting bits in the payload 1050 may depend on the amount of data encoded in the payload, and the CR parameter set for the payload. In some cases, the CR parameter may be set to a high value (e.g., 3 or 4, among other possible values) in circumstances where transmission errors are likely (e.g., when the receiving device is far from the transmitting device, when significant interference is present, etc.). In other cases, the CR parameter may be set to a low value (e.g., 1 or 2, among other possible values) if transmission errors are less likely. In some implementations, the CR parameter for the payload 1050 in downlink messages may be set to zero, such that no error correcting bits are included in the payload 1050. The omission of error correcting bits in the payload 1050 may reduce the complexity of an endpoint device's telecommunication circuitry and/or reduce the amount of processing involved in receiving a downlink data transmission, among other possible advantages.

In some cases, the payload 1050 of a downlink message may contain data related to one or more actions, which the receiving endpoint device may interpret as an instruction to perform a command, operation, or otherwise take some action based on that data. For example, the data may include information related to one or more configuration settings of the endpoint device, along with some indication (e.g., one or more bits representative of an instruction) that the endpoint device is instructed to update or change its currently stored configuration settings based on the received data. As another example, the data may include one or more bits representing a request for information regarding the endpoint device's state (e.g., network information, current configurations, serial number, current sensor information, collected sensor information, etc.). In yet another example, the data may include part or all of a software and/or firmware update, along with one or more bits of data that the endpoint device interprets as an instruction to install the received software and/or firmware update. Other examples of downlink data related to one or more actions on the endpoint device are also possible.

The error bits 1060 may be a cyclic redundancy check (CRC) code or any other suitable error-detecting code used to determine whether any errors occurred in the transmission or receipt of the payload 1050 and/or other portions of the frame. The error bits 1060 may, in some cases, be omitted from a message transmission. For example, the error bits 1060 may be omitted if the payload 1050 does not include any error correcting bits (e.g., in a downlink message from a gateway device).

Although the message structure 1000 describes a series of fields in a particular order, it will be appreciated that fewer or additional fields may be present various implementations. In addition, the specific order of fields within each layer may be different from that explicitly shown and described with respect to FIG. 10, without departing from the scope of the present disclosure.

The message structure 1000 shown and described with respect to FIG. 10, or at least a portion thereof, may be used for both uplink messages and downlink messages. As described herein, an "uplink message" may refer to a message transmitted from an endpoint device to a gateway device, or a gateway device to a server. Similarly, a "downlink message" may refer to a message transmitted from a server to a gateway device, or from a gateway device to an endpoint device. Where a message is transmitted between a gateway device and a server, the structure of that message may omit one or more portions of the message structure 1000 (e.g., no preamble 1012, sync word 1014, PHY header 1016, etc.). In some implementations, an uplink message may not be structurally different from a downlink message, in that both uplink and downlink messages may share the same arrangement of headers, layers, etc., but may contain different data encoded into those bits (e.g., different source and destination addresses, different flags or bits indicating the direction of the message, the values of bits related to uplink-specific and/or downlink-specific messages, etc.).

In other implementations, an uplink message may include some structural differences from a downlink message. For instance, an uplink message may include the receive window control field 1034, while the receive window control field 1034 is omitted in a downlink message entirely (e.g., for at least the reason that the receive window control field 1034 conveys information from an endpoint device to a gateway device, but not necessarily from a gateway device to an endpoint device). As another example, a downlink message may omit the error bits 1060, in part because the gateway device may be configured to send redundant transmissions (e.g., because potential transmission errors can be corrected through a redundant transmission). Other structural differences between uplink and downlink messages are also possible, depending upon the specific implementation.

Figure 11:
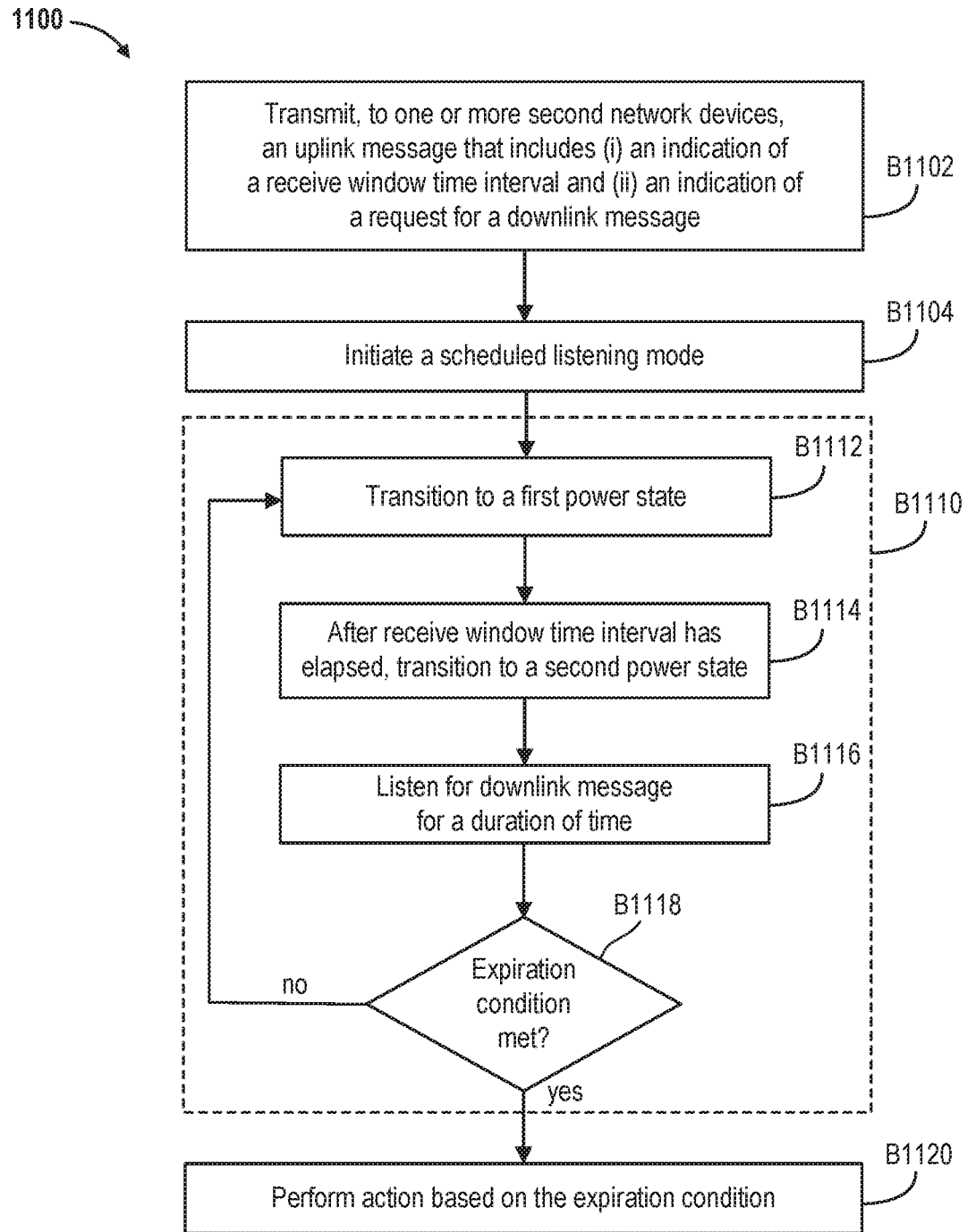
FIG. 11 is a flowchart illustrating an example process for a network device, according to various aspects of the present disclosure.

FIG. 11 is a flowchart illustrating an example process 1100 for a network device, according to various aspects of the present disclosure. The network device, at block B1102, transmits, to one or more second network devices, an uplink message that includes (i) an indication of a receive window time interval and (ii) an indication of a request for a downlink message. The indication of the receive window time interval may be embedded, for example, in the link layer or network layer of the uplink message, as described above with respect to FIG. 10. Similarly, the receive window time interval may be encoded in the network layer, as described above with respect to FIG. 10. The receive window time interval may be encoded as a binary number, with each number representing a time step (e.g., one second, some fraction of a second, etc.). The network device may "transmit" the uplink message to one or more second network devices, which may involve emitting or broadcasting the encoded and modulated signal for receipt by one or more network devices within range of the network device.

The network device, at block B1104, initiates a scheduled receive mode. The scheduled receive mode may involve repeating operations enclosed in block B1110, and may be similar to descriptions above regarding the scheduled receive mode.

The network device, at block B1112, transitions to a first power state. The first power state may be a lower power state, where one or more subsystems of the network device are powered down, clocked down, or otherwise modified so as to reduce their power consumption. The network device may remain at block B1112 until the receive window time interval has elapsed, at which point the network device transitions to a second power state at block B1114. The second power state may be a higher power state than the first power state, and may involve powering up, clocking up, or otherwise bringing one or more subsystems out of a standby or sleep mode.

After transitioning to the second power state, the network device, at block B1116, listens for a downlink message for a duration of time. The duration of time may be a dwell period. In some cases, the duration of time may be at least a minimum duration of time to detect at least the PHY layer of a message, so that the network device can determine whether to return to the low-power state or continue receiving information.

The network device, at block B1118, determines whether an expiration condition has been met. As described above, an expiration condition may be met when a downlink message has been received, when the network device has repeated block B1110 a threshold number of times, when the network device has been executing block B1110 for longer than a threshold duration, and/or when a battery level drops below a threshold level. The expiration condition may be any condition that prevents the network device from repeating block B1110 indefinitely, or otherwise reduces power consumption compared to simply repeating block B1110 indefinitely.

In some implementations, the process 1100 may further involve a step for counting a number of times that the operations of block B1110 have been repeated. For example, the process 1100 may include a step for initializing a counter to a starting value (e.g., 0, among other possible values) and incrementing that counter if the expiration condition is determined not to have been met at block B11118. The counter may represent the number of times that the operations of block B1110 have been repeated. In some cases, the process 1100 (e.g., at block B1118) may involve determining the value of the counter and, if the counter meets or exceeds a threshold value, to determine that an expiration condition has been met. In other cases, the process 1100 may include additional steps that may determine the value stored in the counter as a basis for performing other actions. In yet other examples, the process 1100 may include storing the value of that counter after transitioning to block B1120.

In some implementations, the process 1100 may further involve a step for determining a duration of time that has elapsed since transitioning from block B1104 to block B1112, which may be indicative of a duration of time since initiating the scheduled listening mode. For example, the process 1100 may include a step for determining and storing a starting time value, and subsequently computing a difference between a current time value and the stored starting time value. For example, block B1118 may determine the time elapsed based on the difference between the current time and the stored starting time and, if that value exceeds a threshold, then determining that the expiration condition has been met and transitioning to block B1120.

If an expiration condition has not been met, the network device may return to block B1112. However, if an expiration condition has been met, the network device 1110 may move on to block B1120 and perform an action based on the expiration condition. For example, if the expiration condition is the detection of a downlink message, the action may involve continuing to receive the remainder of the downlink message. As another example, if the expiration condition is related to timeouts, delays, or suspected failure to detect a previously transmitted uplink message, the action may involve terminating the scheduled receive mode and either restarting the scheduled receive mode with a different receive window time interval, initiating a periodic receive mode, and/or transitioning into other modes.

Figure 12:
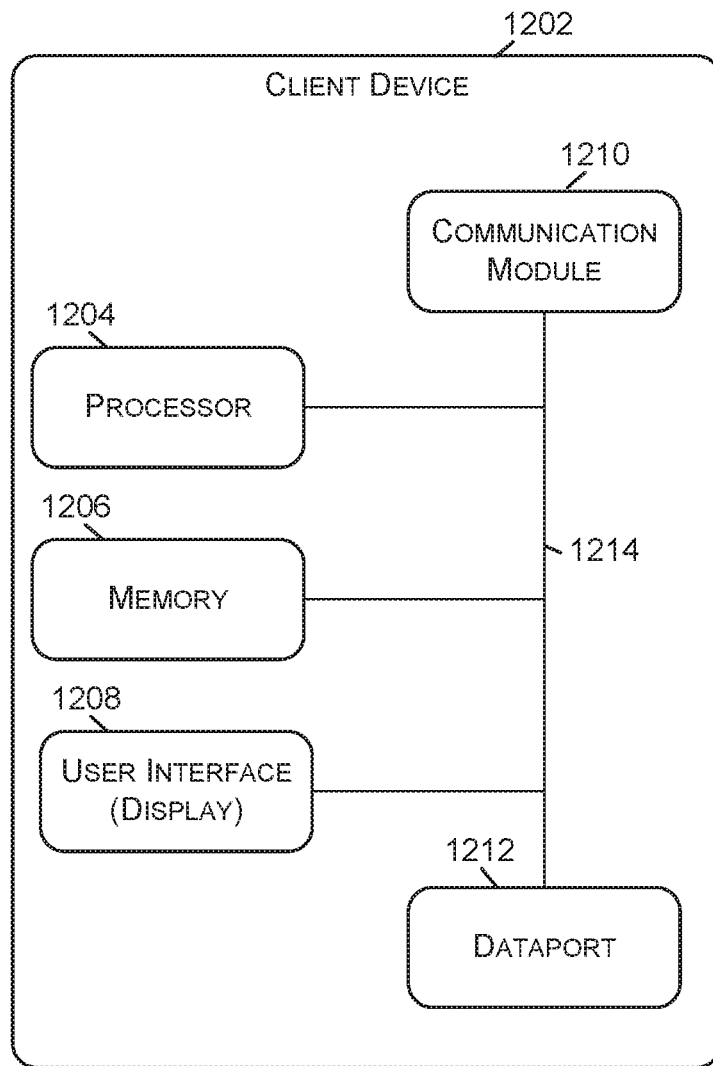
FIG. 12 is a functional block diagram of a client device on which the present embodiments may be implemented, according to various aspects of the present disclosure.

FIG. 12 is a functional block diagram of a client device 1202 on which the present embodiments may be implemented according to various aspects of the present disclosure. The client device(s) 214, 216 described with reference to FIG. 2 may include some or all of the components and/or functionality of the client device 1202. The client device 1202 may comprise, for example, a smartphone.

With reference to FIG. 12, the client device 1202 includes a processor 1204, a memory 1206, a user interface 1208, a communication module 1210, and a dataport 1212. These components are communicatively coupled together by an interconnect bus 1214. The processor 1204 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1206 may include both operating memory, such as random-access memory (RAM), as well as data storage, such as read-only memory (ROM), hard drives, flash memory, or any other suitable memory/storage element. The memory 1206 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1204 and the memory 1206 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1204 may be connected to the memory 1206 via the dataport 1212.

The user interface 1208 may include any user interface or presentation elements suitable for a smartphone and/or a portable computing device, such as a keypad, a display screen, a touchscreen, a microphone, and a speaker. The communication module 1210 is configured to handle communication links between the client device 1202 and other, external devices or receivers, and to route incoming/outgoing data appropriately. For example, inbound data from the dataport 1212 may be routed through the communication module 1210 before being directed to the processor 1204, and outbound data from the processor 1204 may be routed through the communication module 1210 before being directed to the dataport 1212. The communication module 1210 may include one or more transceiver modules capable of transmitting and receiving data, and using, for example, one or more protocols and/or technologies, such as GSM, UNITS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1212 may be any type of connector used for physically interfacing with a smartphone and/or a portable computing device, such as a mini-USB port or an IPHONE®/IPOD® 30-pin connector or LIGHTNING® connector. In other embodiments, the dataport 1212 may include multiple communication channels for simultaneous communication with, for example, other processors, servers, and/or client terminals.

The memory 1206 may store instructions for communicating with other systems, such as a computer. The memory 1206 may store, for example, a program (e.g., computer program code) adapted to direct the processor 1204 in accordance with the present embodiments. The instructions also may include program elements, such as an operating system. While execution of sequences of instructions in the program causes the processor 1204 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 13:
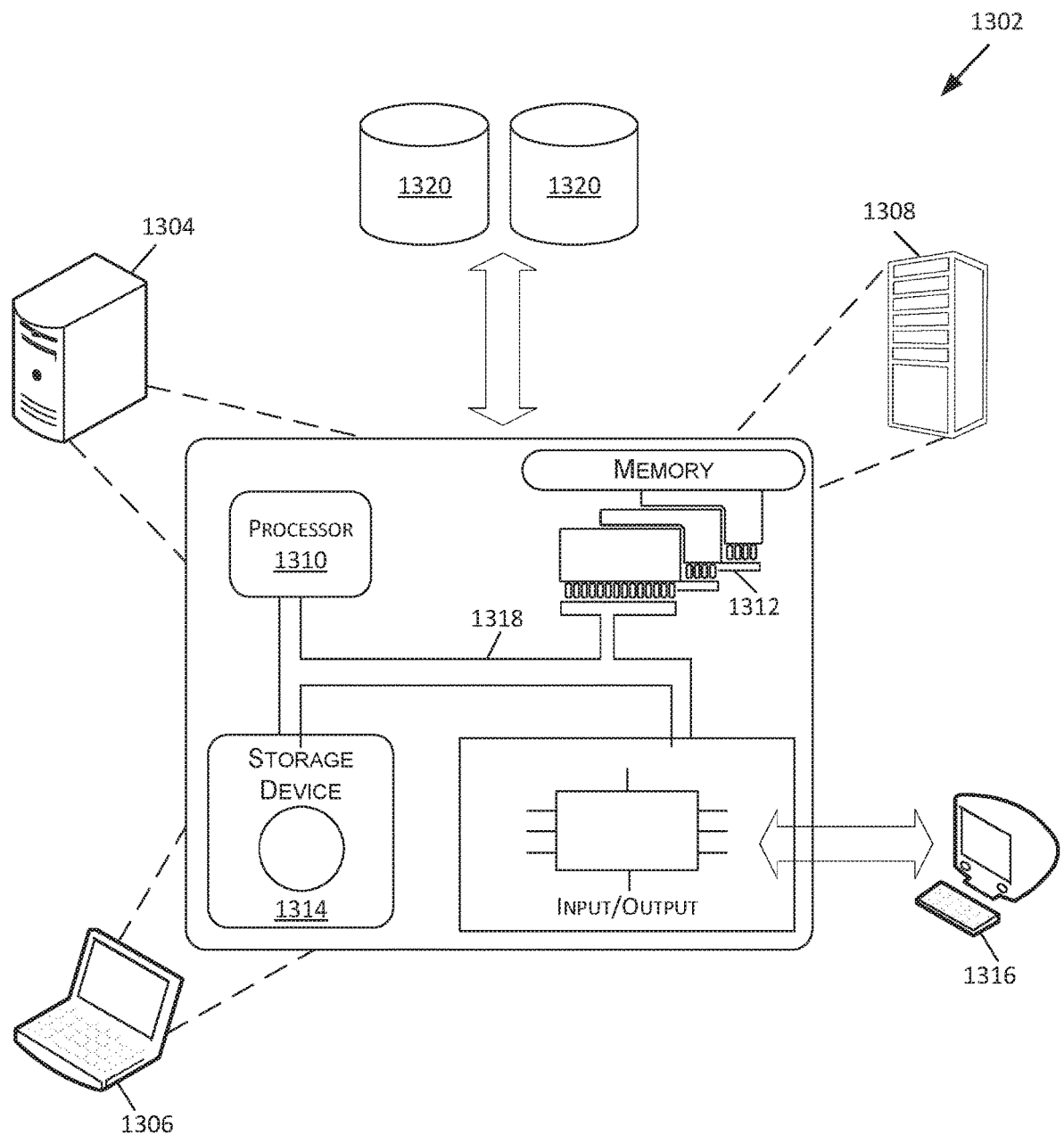
FIG. 13 is a functional block diagram of a general-purpose computing system on which the present embodiments may be implemented, according to various aspects of present disclosure.

FIG. 13 is a functional block diagram of a general-purpose computing system on which the present embodiments may be implemented according to various aspects of the present disclosure. The computer system 1302 may be embodied in at least one of a personal computer (also referred to as a desktop computer) 1304, a portable computer (also referred to as a laptop or notebook computer) 1306, and/or a server 1308 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1302 may execute at least some of the operations described above. The computer system 1302 may include at least one processor 1310, memory 1312, at least one storage device 1314, and input/output (I/O) devices 1316. Some or all of the components 1310, 1312, 1314, 1316 may be interconnected via a system bus 1318. The processor 1310 may be single- or multi-threaded and may have one or more cores. The processor 1310 execute instructions, such as those stored in the memory 1312 and/or in the storage device 1314. Information may be received and output using one or more I/O devices 1316.

The memory 1312 may store information, and may be a computer-readable medium, such as volatile or non-volatile memory. The storage device(s) 1314 may provide storage for the system 1302 and, in some embodiments, may be a computer-readable medium. In various aspects, the storage device(s) 1314 may be a flash memory device, a hard disk device, an optical disk device, a tape device, or any other type of storage device.

The I/O devices 1316 may provide input/output operations for the system 1302. The I/O devices 1316 may include a keyboard, a pointing device, and/or a microphone. The I/O devices 1316 may further include a display unit for displaying graphical user interfaces, a speaker, and/or a printer. External data may be stored in one or more accessible external databases 1320.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

In a first aspect, a method for a first network device is provided. The method includes transmitting, to one or more second network devices, an uplink message. The uplink message includes an indication of a receive window time interval, and may also include an indication of a request for a downlink message. The method also includes initiating a scheduled receive mode that causes the first network device to repeat a set of operations after transmitting the uplink message. The operations include transitioning the first network device to a first power state. The operations also include performing a receive window procedure after the receive window time interval has elapsed. The receive window procedure includes transitioning the first network device to a second power state. The receive window procedure also includes listening for the downlink message for a duration of time after transitioning the first network device to the second power state. The method further includes determining that an expiration condition has been met while the first network device is in the scheduled receive mode. Additionally, the method includes terminating the scheduled receive mode upon determining that the expiration condition has been met.

In an embodiment of the first aspect, the receive window time interval is a first receive window time interval and the uplink message is a first uplink message. In this embodiment, the method also includes transmitting, to the one or more second network devices, a second uplink message after terminating the scheduled receive mode. The second uplink message includes an indication of a second receive window time interval, and may also include an indication of the request for the downlink message. The second receive window time interval may be longer than the first receive window time interval. The method also includes initiating the scheduled receive mode using the second receive window time interval to repeat a set of operations after transmitting the second uplink message. The operations include transitioning the first network device to the first power state. The operations also include performing a receive window procedure after the second receive window time interval has elapsed. The receive window procedure includes transitioning the first network device to the second power state. The receive window procedure also includes listening for the downlink message for a duration of time after transitioning the first network device to the second power state.

In another embodiment of the first aspect, the first network device includes a battery. In this embodiment, the method also includes determining the receive window time interval based at least partly on a power level of the battery of the first network device.

In another embodiment of the first aspect, the first network device includes a battery. In this embodiment, listening for the downlink message for a duration of time may involve determining the duration of time during which the first network device listens for the downlink message based at least partly on a power level of the battery of the first network device.

In another embodiment of the first aspect, the uplink message is a first uplink message. In this embodiment, the method may further include transmitting, to the one or more second network devices, a second uplink message that includes an indication that the first network device has terminated the scheduled receive mode after terminating the scheduled receive mode.

In another embodiment of the first aspect, determining that the expiration condition has been met may involve receiving, by the first network device, the downlink message and determining that the expiration condition has been met based on receiving the downlink message. In some implementations, the first network device may receive the downlink message from a third network device that is not among the one or more second network devices. In some implementations, the method may additionally involve determining, by the first network device, that the downlink message may involve a command to perform one or more actions, and performing, by the first network device, the one or more actions based on the command.

In another embodiment of the first aspect, determining that the expiration condition has been met may involve determining that the first network device has repeated the operations of the scheduled receive mode a number of times. Determining that the expiration condition has been met may also involve determining that the number of times meets or exceeds a threshold number of times. Determining that the expiration condition has been met may further involve determining that the expiration condition has been met based on determining that the number of times meets or exceeds the threshold number of times.

In another embodiment of the first aspect, the first network device includes a battery. In this embodiment, determining that the expiration condition has been met may involve determining that a power level of the battery is below a threshold power level. Determining that the expiration condition has been met may also involve determining that the expiration condition has been met based on determining that the power level of the battery is below the threshold power level.

In a second aspect, a first network device is provided. The first network device includes a battery, at least one processor, a wireless communication radio, and a memory storing a communication application comprising instructions that, when executed by the at least one processor, cause the first network device to perform operations. The operations include transmitting, to one or more second network devices, an uplink message that includes an indication of a receive window time interval and an indication of a request for a downlink message. The operations also include initiating a scheduled receive mode that causes the first network device to (i) transition the first network device to a first power state, and (ii) perform a receive window procedure after the receive window time interval has elapsed. The receive window procedure includes transitioning the first network device to a second power state. The receive window procedure also includes listening, by the wireless communication radio, for the downlink message for a duration of time after transitioning the first network device to the second power state. The operations further include determining that an expiration condition has been met while the first network device is in the scheduled receive mode. Additionally, the operations include terminating the scheduled receive mode upon determining that the expiration condition has been met.

In an embodiment of the second aspect, communication application comprising further instructions that, when executed by the at least one processor, cause the first network device to initiate a periodic receive mode that causes the first network device to repeat operations after terminating the scheduled receive mode. The operations include transitioning the first network device to the first power state. The operations also include performing a downlink message detection procedure after a first period of time has elapsed. The downlink message detection procedure includes transitioning the first network device to the second power state. The downlink message detection procedure includes listening, by the wireless communication radio, for a downlink message for a second period of time. In some implementations, the first period of time is longer than the receive window time interval.

In an embodiment of the second aspect, the first network device further includes instructions that, when executed by the at least one processor, further cause the first network device to determine a power level of the battery of the first network device before initiating the scheduled receive mode, and to determine the receive window time interval based on the power level of the battery of the first network device.

In a third aspect, a method for a first network device is provided. The method includes receiving, from a second network device at a first time, an uplink message that includes an indication of a receive window time interval and an indication of a request for a downlink message. The method also includes transmitting, to a computing device, at least a portion of the uplink message. The method further includes receiving, from the computing device, the downlink message. Additionally, the method includes determining a second time that occurs after the first time based on the first time and the receive window time interval. Further, the method includes transitioning, at the second time, to a low data rate (LDR) transmission mode. The method additionally includes transmitting, to the second network device, at least a portion of the downlink message after transitioning to the LDR transmission mode.

In an embodiment of the third aspect, the downlink message is a first downlink message. In this embodiment, the method also includes receiving, from the computing device, a second downlink message associated with a third network device. The method may further include determining a third time at which to transmit at least a portion of the second downlink message to the third network device. The method may additionally include transmitting, to the third network device, at least a portion of the downlink message to the third network device after the third time. In some implementations, determining the third time involves determining that the third network device communicates using a high data rate (HDR) communication mode, and determining the third time based at least in part on the second time and a duration of the LDR transmission mode. In some cases, the method may further include transitioning, at the third time, to a high data rate (HDR) transmission mode.

In an embodiment of the third aspect, the method may also include transitioning to a high data rate (HDR) receiving mode after transmitting at least the portion of the downlink message to the second network device.

In an embodiment of the third aspect, the method may also include transitioning to an LDR receiving mode after transmitting at least the portion of the downlink message to the second network device.

What is claimed is:

1. A method performed by a first network device, the method comprising:
    operating in a receive cycling mode by repeatedly:
        executing the first network device in a low data rate (LDR) receive mode for a first time interval;
        upon expiration of the first time interval, transitioning the first network device from the LDR receive mode to a high data rate (HDR) receive mode;
        executing the first network device in the HDR receive mode for a second time interval; and
        upon expiration of the second time interval, transitioning the first network device from the HDR receive mode to the LDR receive mode; and
    while operating in the receive cycling mode, receiving, at the first network device, a portion of a message from a second network device;
    transitioning, based at least in part on the receiving of the portion of the message, the first network device out of the receive cycling mode.

2. The method of claim 1, wherein receiving the portion of the message comprises receiving a first portion of a first signal, and wherein the transitioning of the first network device out of the receive cycling mode is based at least in part on determining that the first portion of the first signal corresponds to a preamble.

3. The method of claim 1, wherein the method comprises, based at least in part on the receiving of the portion of the message, transitioning the first network device to a second LDR receive mode for a third time interval that is longer than the first time interval.

4. The method of claim 3, further comprising upon expiration of the third time interval, transitioning the first network device from the second LDR receive mode to a standby mode until a next scheduled mode is to begin.

5. The method of claim 1, wherein the method comprises, based at least in part on the receiving of the portion of the message, transitioning the first network device to a second HDR receive mode for a fourth time interval that is longer than the second time interval.

6. The method of claim 5, further comprising upon expiration of the fourth time interval, transitioning the first network device from the second HDR receive mode to a standby mode until a next scheduled mode is to begin.

7. The method of claim 1, wherein the second time interval is shorter than the first time interval.

8. The method of claim 1, wherein the receiving, at the first network device, the portion of the message from the second network device comprises receiving the portion of the message at the first network device during the LDR receive mode, and wherein the message is a first message sent from the second network device using a LDR protocol.

9. The method of claim 1, wherein the receiving, at the first network device, the portion of the message from the second network device comprises receiving the portion of the message at the first network device during the HDR receive mode, and wherein the message is a first message sent from the second network device using a HDR protocol.

10. A first network device comprising:
one or more wireless radios;
one or more processors;
one or more non-transitory computer-readable media storing instructions that, when executed by the one or more processors, cause the first network device to perform operations comprising:
operating in a receive cycling mode, including
transitioning from a low data rate (LDR) receive mode to a high data rate (HDR) receive mode based on a first time interval, and
transitioning from the HDR receive mode to the LDR receive mode based on a second time interval that is shorter than the first time interval;
while operating in the LDR receive mode or the HDR receive mode, detecting a preamble of an uplink message sent from a second network device; and
based on the detecting of the preamble, transitioning out of the receive cycling mode.

11. The first network device of claim 10, wherein the one or more computer-readable media store instructions that, when executed by the one or more processors, cause the first network device to perform operations comprising
upon receiving a downlink message, transition from the receive cycling mode to an LDR transmit mode.

12. The first network device of claim 10, the one or more computer-readable media store instructions that, when executed by the one or more processors, cause the first network device to perform operations comprising, based on detecting the preamble of the uplink message sent from the second network device causing the first network device to extend the first time interval.

13. A method for a first network device, the method comprising:
transitioning from a first receive mode to a second receive mode based on a first time interval, a first one of the first receive mode and the second receive mode being a low data rate (LDR) receive mode, and a second one of the first receive mode and the second receive mode being a high data rate (HDR) receive mode;
transitioning, at a first time, from the second receive mode to the first receive mode based on a second time interval that is shorter than the first time interval;
while operating in the first receive mode, detecting a preamble of an uplink message sent from a second network device;
continuing, based at least in part on the detecting of the preamble of the uplink message, to operate in the first receive mode;
receiving, based on the continuing to operate in the first receive mode, at least a portion of the uplink message at a second time that occurs more than the first time interval after the first time.

14. The method of claim 13, wherein the method comprises receiving at least a first portion of a first signal transmitted by the second network device, and wherein the detecting of the preamble of the uplink message sent from the second network device comprises determining that the first portion of the first signal corresponds to the preamble.

15. The method of claim 14, wherein receiving at least the portion of the uplink message at the second time comprises receiving at least a second portion of the first signal at the second time.

16. The method of claim 13, wherein the transitioning from the first receive mode to the second receive mode based on the first time interval and the transitioning from the second receive mode to the first receive mode based on a second time interval occur based on the first network device operating in a receive cycling mode, and wherein the method comprises ceasing, based at least in part on the detecting of the preamble of the uplink message, to operate in the receive cycling mode.

17. The method of claim 13, wherein the method comprises, after receiving the uplink message, transitioning to a standby mode.

18. The method of claim 13, wherein the method comprises
after receiving the uplink message, determining, based on at least one of the first time interval and the second time interval, a next receive mode that is set to begin at a third time, the next receive mode being an LDR receive mode or an HDR receive mode; and
transitioning to the next receive mode at the third time.

19. The method of claim 12, wherein the uplink message comprises first data indicating a receive window time interval of the second network device, and wherein the method comprises transmitting, to a computing device, second data that includes at least a portion of the uplink message, the second data comprising an indication of the receive window time interval.

20. The method of claim 13, wherein the uplink message comprises first data indicating a receive window time interval of the second network device, and wherein the method comprises
receiving, from a computing device, a first downlink message;
transitioning to a LDR transmission mode; and
after transitioning to the LDR transmission mode, transmitting, at a third time based at least in part on the receive window time interval, to the second network device, at least a portion of the first downlink message.

21. The method of claim 13, wherein the method comprises
- receiving, from a computing device, a first downlink message, the first downlink message including an indication of a receive window time interval of the second network device;
- transitioning to a LDR transmission mode; and
  - after transitioning to the LDR transmission mode, transmitting, at a third time based at least in part on the receive window time interval, to the second network device, at least a portion of the first downlink message.

22. The method of claim 13, wherein continuing to operate in the first receive mode comprises transitioning to a longer duration LDR receive mode or transitioning to a longer duration HDR receive mode.

23. The method of claim 13, wherein the first receive mode comprises an LDR receive mode, the second receive mode comprises an HDR receive mode, and the second time interval is shorter than the first time interval.

24. The method of claim 13, wherein the first receive mode comprises an LDR receive mode, the second receive mode comprises an HDR receive mode, and the second time interval is longer than the first time interval.

\* \* \* \* \*